(12) United States Patent
Good et al.

(10) Patent No.: US 10,457,379 B2
(45) Date of Patent: *Oct. 29, 2019

(54) BACKUP SYSTEM

(71) Applicant: The Boeing Company, Chicago, IL (US)

(72) Inventors: Mark Steven Good, Seattle, WA (US); Matthew August Lassen, Seattle, WA (US); Michael E. Renzelmann, Woodinville, WA (US); Mark J. Gardner, Snohomish, WA (US); Mark William Lesyna, Everett, WA (US); Brian Curtis Hill, Everett, WA (US); Nicholas Seth Tyler, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,327

(22) Filed: Jul. 6, 2018

(65) Prior Publication Data
US 2018/0312240 A1 Nov. 1, 2018

Related U.S. Application Data

(63) Continuation of application No. 14/535,864, filed on Nov. 7, 2014, now Pat. No. 10,106,244.

(51) Int. Cl.
*B64C 3/56* (2006.01)
*B64C 13/50* (2006.01)
(Continued)

(52) U.S. Cl.
CPC ................ *B64C 3/56* (2013.01); *B64C 13/40* (2013.01); *B64C 13/42* (2013.01); *B64C 13/505* (2018.01); *B64C 13/50* (2013.01); *Y02T 50/14* (2013.01)

(58) Field of Classification Search
CPC .... B64C 3/56; B64C 3/13; B64C 3/42; B64C 13/505
(Continued)

(56) References Cited

U.S. PATENT DOCUMENTS 4,876,906 A 10/1989 Jones
5,201,479 A 4/1993 Renzelmann
(Continued)

FOREIGN PATENT DOCUMENTS

| CN | 103786871 A | 5/2014 |
|---|---|---|
| CN | 105584624 A | 5/2016 |
| EP | 1721826 A1 | 11/2006 |

OTHER PUBLICATIONS

Extended European Search Report, dated Mar. 15, 2016, regarding Application No. EP15192376.0, 12 pages.
(Continued)

*Primary Examiner* — Christopher P Ellis
(74) *Attorney, Agent, or Firm* — Yee & Associates, P.C.

(57) ABSTRACT

A system and method for a number of backup systems in an aircraft. The apparatus comprises a movement system; a latch system; a lock system; and at least one of a backup valve, a backup actuator, or a backup power source connected to at least one of the movement system, the latch system, or the lock system. The movement system has a first number of actuators and is connected to a hydraulic power source. The latch system has a second number of actuators and is connected to the hydraulic power source. The lock system has a third number of actuators and is connected to the hydraulic power source.

16 Claims, 13 Drawing Sheets

(51) Int. Cl.
    *B64C 13/40*      (2006.01)
    *B64C 13/42*      (2006.01)

(58) Field of Classification Search
    USPC .......................................................... 244/49
    See application file for complete search history.

(56) References Cited

U.S. PATENT DOCUMENTS

| | | |
|---|---|---|
| 5,310,138 A | 5/1994 | Fitzgibbon |
| 5,350,135 A | 9/1994 | Renzelmann et al. |
| 5,379,969 A | 1/1995 | Marx et al. |
| 5,381,986 A | 1/1995 | Smith et al. |
| 5,427,329 A | 6/1995 | Renzelmann et al. |
| 5,452,643 A | 9/1995 | Smith et al. |
| 6,260,799 B1 | 7/2001 | Russ |
| 8,708,286 B2 | 4/2014 | Sakurai et al. |
| 8,733,692 B2 | 5/2014 | Kordel et al. |
| 10,106,244 B2 | 10/2018 | Good et al. |
| 2010/0116929 A1 | 5/2010 | Hejda |
| 2011/0036939 A1 | 2/2011 | Easter |
| 2013/0099060 A1 | 4/2013 | Dees et al. |
| 2014/0014768 A1 | 1/2014 | Lassen et al. |
| 2014/0061371 A1 | 3/2014 | Good et al. |
| 2014/0117150 A1 | 5/2014 | Good et al. |
| 2014/0306067 A1 | 10/2014 | Guida |
| 2015/0014478 A1 | 1/2015 | Lassen et al. |
| 2015/0210377 A1 | 7/2015 | Good et al. |
| 2016/0023527 A1 | 1/2016 | Dietrich |
| 2016/0207608 A1 | 7/2016 | Good et al. |
| 2017/0057619 A1 | 3/2017 | Wilson et al. |

OTHER PUBLICATIONS

Canadian Intellectual Property Office, Office Action, dated Jun. 27, 2017, regarding Application No. 2,900,860, 4 pages.

Canadian Intellectual Property Office Examination Search Report, dated May 9, 2018, regarding Application No. 2,900,860, 6 pages.

Good, "Lock Actuation System for Aircraft," U.S. Appl. No. 14/303,443, filed Jun. 12, 2014, 51 pages.

Office Action, dated Sep. 7, 2017, regarding U.S. Appl. No. 14/535,864, 22 pages.

Notice of Allowance, dated Mar. 5, 2018, regarding U.S. Appl. No. 14/535,864, 5 pages.

Canadian Intellectual Property Office Examination Search Report, dated Aug. 1, 2016, regarding Application No. 2,900,860, 4 pages.

European Patent Office Examination Search Report, dated Feb. 16, 2018, regarding Application No. EP15192376.0, 6 pages.

Australian Government IP Australia Examination Report No. 1 for Standard Patent Application, dated Oct. 16, 2018, regarding Application No. 2015213379, 4 pages.

European Patent Office Examination Search Report, dated Jan. 30, 2019, regarding Application No. 15192376.0, 4 pages.

State Intellectual Property Office of PRC, Notification of First Office Action, Search Report, and English translation, dated May 21, 2019, regarding Application No. 20151067843.0, 17 pages.

BACKUP SYSTEM

CROSS REFERENCE TO RELATED APPLICATIONS

This application is a continuation of co-pending U.S. Pat. No. 10,106,244, entitled "Backup System," filed on Nov. 7, 2014 and issued on Oct. 3, 2018, which is hereby incorporated by reference in its entirety.

BACKGROUND INFORMATION

In the commercial air transport industry, it is desirable to design aircraft configurations that yield reduced fuel burn per seat-mile, as fuel burn per seat-mile is a measure of fuel efficiency. Efficient aircraft configurations are ever more important as fuel costs continue to increase. Aircraft aerodynamic drag and fuel burn are generally reduced as the aspect ratio of the aircraft wing increases. Similarly, operating larger aircraft which carry more passengers and payload is generally more efficient between two destinations than flying several trips with smaller aircraft. Thus, larger aircraft and aircraft with longer wingspans tend to be more efficient. However, taxiway spacing and gate locations for most airports were designed for aircraft with smaller wingspans than many aircraft that may be produced with today's technology.

1. Field

This disclosure relates to systems and methods for controlling wings, and more specifically, to systems and methods for controlling wingtips to enhance aircraft performance and fuel efficiency.

2. Background

In the commercial air transport industry, it is desirable to design aircraft configurations that yield reduced fuel burn per seat-mile, as fuel burn per seat-mile is a measure of fuel efficiency. Efficient aircraft configurations are ever more important as fuel costs continue to increase. Aircraft aerodynamic drag and fuel burn are generally reduced as the aspect ratio of the aircraft wing increases. Similarly, operating larger aircraft which carry more passengers and payload is generally more efficient between two destinations than flying several trips with smaller aircraft. Thus, larger aircraft and aircraft with longer wingspans tend to be more efficient. However, taxiway spacing and gate locations for most airports were designed for aircraft with smaller wingspans than many aircraft that may be produced with today's technology.

A folding wing design may be used to reduce the span of wings to fit within the limitations of an existing airport's infrastructure. A folding wing design may have folding wing tips that may be folded to fit within runways, taxiways, and gate areas, and that may be extended prior to takeoff to increase wingspan.

If a folding wing tip does not fold as directed, the aircraft may not fit within the limitations of an existing airport's infrastructure. If a folding wing tip does not extend as directed, the aircraft may not be able to operate.

Therefore, it would be desirable to have a method and apparatus that take into account at least some of the issues discussed above, as well as other possible issues. Specifically, one issue is to find a method and apparatus for folding and extending a folding wing tip.

SUMMARY

An illustrative embodiment of the present disclosure provides a method. The method comprises determining whether each of a movement system, a latch system, and a lock system is responsive. The method further comprises in response to determining one of the movement system, the latch system, or the lock system is not responsive, utilizing at least one of a backup valve, a backup actuator, or a backup power source to perform an operation of a folding wing tip with at least one of the movement system, the latch system, or the lock system.

Another illustrative embodiment of the present disclosure provides a method. The method comprises sending commands, wherein the commands include a command to a movement system to move a folding wing tip to a first position and a command to at least one of a latch system or a lock system to secure the folding wing tip in the first position; in response to at least one of the movement system, the latch system, or the lock system not responding to the commands, sending a command to utilize at least one of a backup valve, a backup actuator, or a backup power source connected to at least one of the movement system, the latch system, or the lock system in one of moving the folding wing tip to the first position or securing the folding wing tip in the first position.

A further illustrative embodiment of the present disclosure provides an apparatus for movement of a folding wing tip. The apparatus comprises a movement system; a latch system; a lock system; and at least one of a backup valve, a backup actuator, or a backup power source connected to at least one of the movement system, the latch system, or the lock system. The movement system has a first number of actuators and is connected to a hydraulic power source. The latch system has a second number of actuators and is connected to the hydraulic power source. The lock system has a third number of actuators and is connected to the hydraulic power source.

A yet further illustrative embodiment of the present disclosure provides an apparatus for movement of a folding wing tip. The apparatus comprises a number of actuators, a hydraulic power source, and at least one of a backup valve, a backup actuator, or a backup power source. The number of actuators is connected to at least one of a movement system, a latch system, or a lock system. The hydraulic power source is connected to the number of actuators. The at least one of the backup valve, the backup actuator, or the backup power source is connected to at least one of the movement system, the latch system, or the lock system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
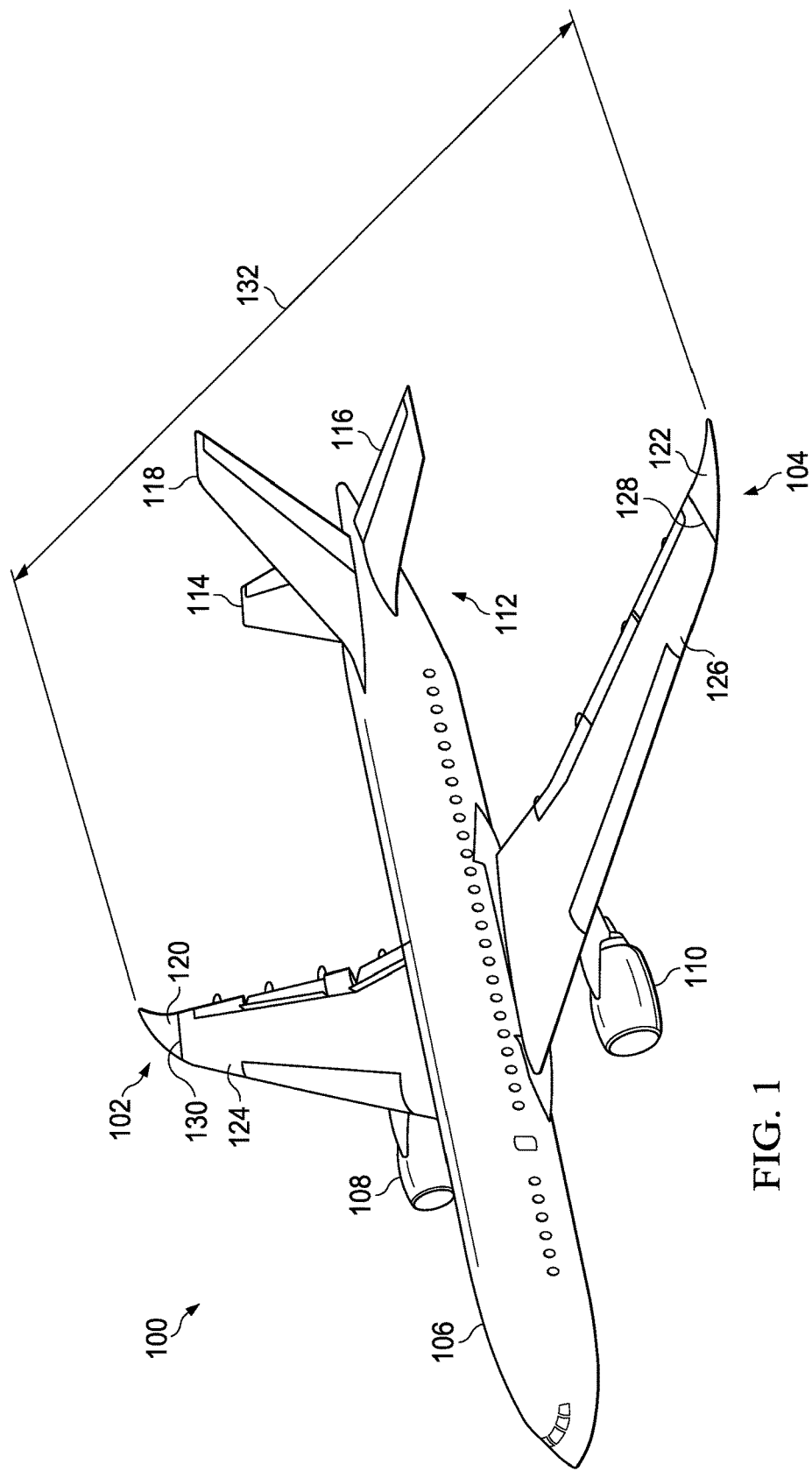
FIG. 1 is an illustration of an aircraft having a backup system in accordance with an illustrative embodiment.

The illustrative embodiments may recognize and take into account one or more different considerations. For example, the illustrative embodiments recognize and take into account that an aircraft may benefit from a long wingspan in flight, while being able to reduce the wingspan when operating at an airport, such as but not limited to, International Civil Aviation Organization "code E" or Federal Aviation Administration "code V" airports, may be desirable with respect to increasing the flexibility of where an aircraft may operate. In particular, by being able to reduce the wingspan while on the ground, an aircraft may be able to operate at more airports than if the aircraft could not reduce its wingspan while on the ground. With the longer wingspan during flight, benefits may include fuel efficiency.

The illustrative embodiments recognize and take into account that folding wing designs enable naval aircraft to operate from the limited deck space of aircraft carriers. Folding wings allow a naval aircraft to occupy less space in a confined aircraft carrier hangar because the folded wings normally rise over the aircraft's fuselage.

However, naval aircraft are much smaller than large commercial aircraft, and present folding wing designs for naval aircraft are optimized to different mission parameters than large commercial aircraft. For example, naval aircraft may have more intensive maintenance between flights than commercial aircraft. Accordingly, it may be acceptable for mechanics to manually fold the wings, should the wings not fold following a flight. Further, naval aircraft are closer to the ground than commercial aircraft. Accordingly, folding wings of naval aircraft may be more easily accessed than wings of commercial aircraft.

The illustrative embodiments further recognize and take into account that it may require a lift to access a folding wing tip of a commercial aircraft. The illustrative embodiments also recognize and take into account that a commercial aircraft would have to be moved to a location in the airport where a mechanic could work safely. Yet further, the illustrative embodiments recognize and take into account that a mechanic would require specific tools to access and manually operate the folding wing tip.

The illustrative embodiments recognize and take into account that manually operating a folding wing tip on a commercial aircraft may require an undesirable amount of time. Further, the illustrative embodiments recognize and take into account that manually operating a folding wing tip on a commercial aircraft may undesirably delay the operation of other aircraft. In some illustrative examples, a commercial aircraft may undesirably block portions of an airport for other aircraft.

The illustrative embodiments also recognize and take into account that commercial aircraft may desirably have a minimal amount of maintenance between flights. Specifically, commercial aircraft may have much less maintenance between flights than naval aircraft.

The illustrative embodiments recognize and take into account that providing electronic redundancy such as having two control channels may have relatively low cost and relatively low weight. The illustrative embodiments recognize and take into account that mechanical backup components may have at least one of a higher cost or a higher weight than electronic components.

The illustrative embodiments further recognize and take into account that increases in aircraft weight are undesirable because operating costs such as fuel costs are increased. Consequently, the increase in weight may negate the advantages offered by any additional parts. As a result, the illustrative embodiments recognize and take into account that the increased aircraft weight may not justify mechanical backup systems on naval aircraft. The illustrative embodiments further recognize and take into account that due to commercial aircraft considerations, the increased aircraft weight due to mechanical backup systems may be desirable.

The illustrative embodiments also recognize and take into account that it may be desirable to back up the components with a higher likelihood to become nonresponsive. It may be more desirable to backup components with a higher likelihood to become nonresponsive than to decrease weight of the aircraft.

The illustrative embodiments recognize that availability may be a probability that a function will work when it is commanded. The illustrative embodiments recognize that reliability may be a measure of the frequency that the system has a nonresponsive event that may trigger a repair. A system that has components that become nonresponsive often will have a low reliability. The illustrative embodiments recognize and take into account that it may be desirable to balance an improvement in availability against negative impacts on reliability due to the addition of more components such as backup systems.

Figure 2:
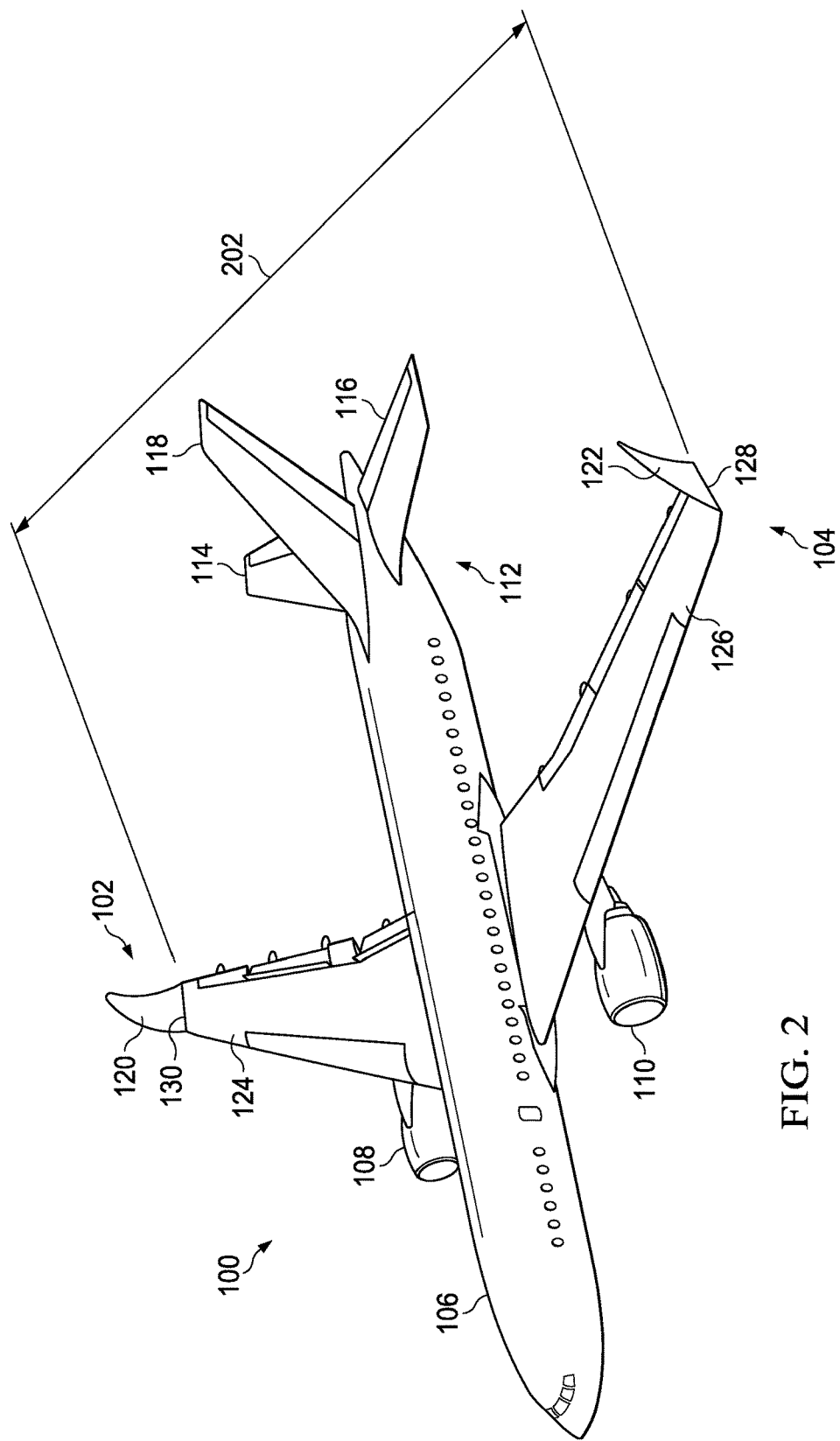
FIG. 2 is an illustration of an aircraft having a backup system in accordance with an illustrative embodiment.

With reference now to the figures, and in particular, with reference to FIGS. 1 and 2, illustrations of an aircraft having a backup system is depicted in accordance with an illustrative embodiment. FIG. 1 depicts aircraft 100 in a flight position, while FIG. 2 depicts aircraft 100 in a taxiing or folded position. Reference numerals used in FIG. 1 are also used in FIG. 2.

Aircraft 100 may be an example of an aircraft in which a backup system may be implemented in accordance with an illustrative embodiment. In an illustrative embodiment, aircraft 100 may include wing 102 and wing 104 attached to body 106; engine 108 attached to wing 102; and engine 110 attached to wing 104.

Body 106 has tail section 112. Horizontal stabilizer 114, horizontal stabilizer 116, and vertical stabilizer 118 are attached to tail section 112 of body 106. Wing 102 may include fixed portion 124 and unfixed portion 120. Fixed portion 124 may be an inboard portion of wing 102, which may be fixed to body 106. Similarly, wing 104 may include fixed portion 126 and unfixed portion 122.

Wing 104 may include wing fold system 128 to move unfixed portion 122 with respect to fixed portion 126. Wing 102 may include wing fold system 130 to move unfixed portion 120 with respect to fixed portion 124. Wing fold system 128 and wing fold system 130 each include a latch assembly (not depicted in FIG. 1 or FIG. 2) in accordance with an illustrative embodiment.

FIG. 1 depicts wings 102 and 104 of aircraft 100 in a flight position, with wingspan 132. FIG. 2 depicts wings 102 and 104 aircraft 100 in a folded position, with wingspan 202. Wingspan 202 may be less than wingspan 132.

Aircraft 100 is an example of an aircraft in which a backup system may be implemented in accordance with an illustrative embodiment. For example, a number of backup systems may be associated with at least one of wing fold system 128 and wing fold system 130. The number of backup systems may allow at least one of wing fold system 128 or wing fold system 130 to perform functions related to at least one of unfixed portion 120 or unfixed portion 122 in the event that portions of wing fold system 128 or wing fold system 130 become unresponsive. For example, a backup system may allow wing fold system 128 to perform functions related to unfixed portion 122 should one of a latch system, a movement system, or a lock system of wing fold system 128 become unresponsive.

This illustration of aircraft 100 is provided for purposes of illustrating one environment in which the different illustrative embodiments may be implemented. The illustration of aircraft 100 in FIG. 1 is not meant to imply architectural limitations to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable types of aircraft.

Figure 3:
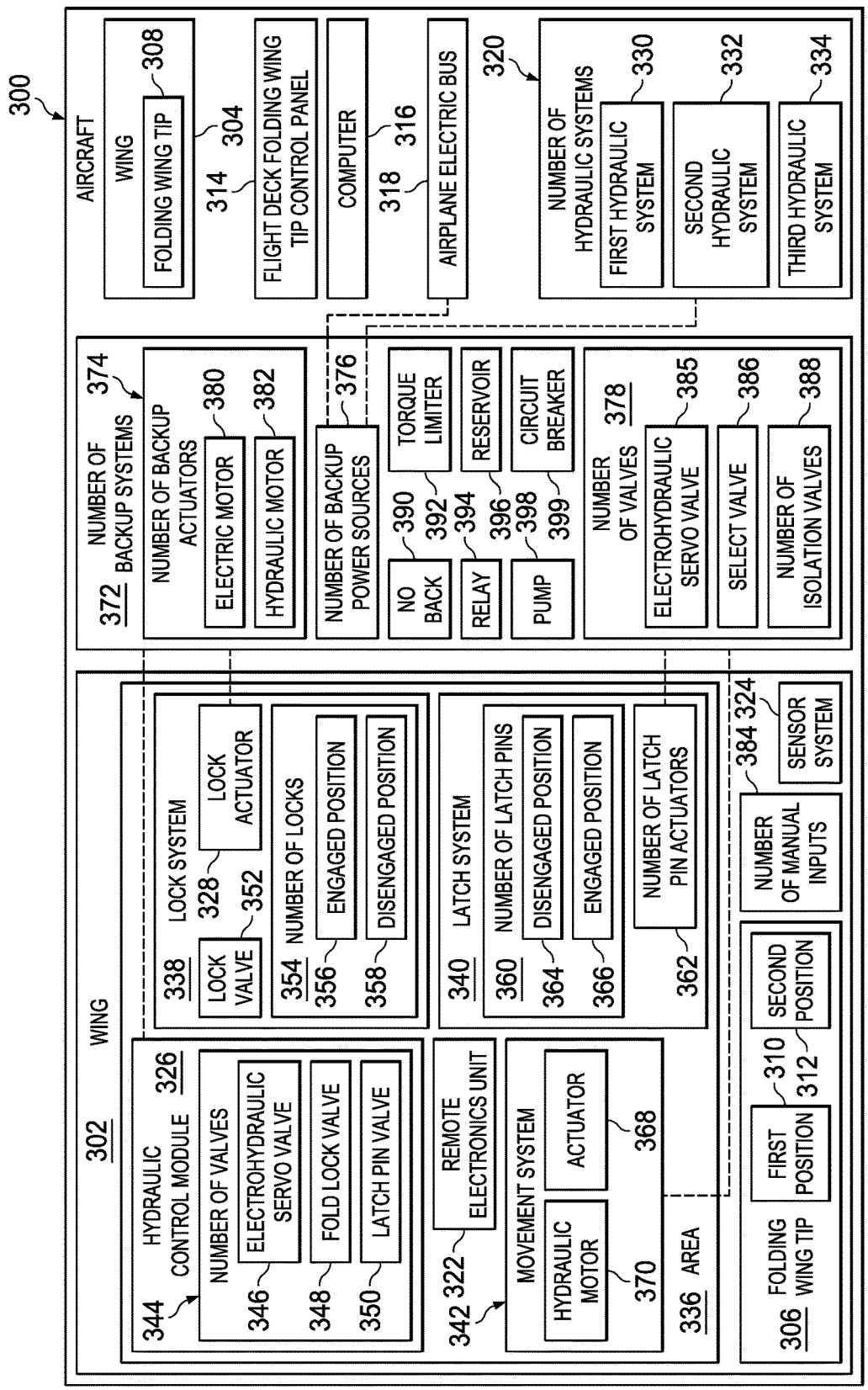
FIG. 3 is an illustration of a block diagram of an aircraft having a number of backup systems in accordance with an illustrative embodiment.

Turning now to FIG. 3, an illustration of a block diagram of an aircraft having a number of backup systems is depicted in accordance with an illustrative embodiment. Aircraft 300 may be an illustrative embodiment of aircraft 100 depicted in FIG. 1 and FIG. 2.

Aircraft 300 has wing 302 and wing 304. Wing 302 has folding wing tip 306. Wing 304 has folding wing tip 308. Folding wing tip 306 may be moved between first position 310 and second position 312. In some illustrative examples, first position 310 may be an extended or flight position. In a flight position, folding wing tip 306 may be extended such that wing 302 has an increased length. In some illustrative examples, second position 312 may be a folded or taxiing position. In a taxiing position, folding wing tip 306 may be folded such that wing 302 has a shorter length. In some illustrative examples, first position 310 may be a taxiing position while second position 312 is a flight position. Folding wing tip 306 may move through a number of transitional locations between first position 310 and second position 312.

Aircraft 300 may also have flight deck folding wing tip control panel 314, computer 316, airplane electric bus 318, and number of hydraulic systems 320. Flight deck folding wing tip control panel 314 may control operation of at least one of folding wing tip 306 or folding wing tip 308.

As used herein, the phrase "at least one of," when used with a list of items, means different combinations of one or more of the listed items may be used and only one of each item in the a list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination of items and number of items may be used from the list but not all of the items in the list are required.

Without limitation, flight deck folding wing tip control panel 314 may include a switch, screen or device in a cockpit, a controller or other processor in or linked to aircraft 300. An aircraft operator may be a crew member in a cockpit, or another operator, which may be a processor. Flight deck folding wing tip control panel 314 may allow for inputs from a crew member or other operator to control at least one of folding wing tip 306 or folding wing tip 308.

Computer 316 may receive inputs from the crew member or other operator. Computer 316 may create commands based on the inputs from the crew member or other operator. For example, computer 316 may create commands to move folding wing tip 306 from first position 310 to second position 312. Further, computer 316 may create commands to move folding wing tip 306 from second position 312 to first position 310.

Airplane electric bus 318 may be a system for electrical power distribution on aircraft 300. Airplane electric bus 318 may provide electricity to a number of systems associated with wing 302. For example, airplane electric bus 318 may provide electricity to remote electronics unit 322. Remote electronics unit 322 may provide electricity to at least one of sensor system 324, hydraulic control module 326, or lock actuator 328.

Number of hydraulic systems 320 may provide hydraulic power to systems of aircraft 300. Number of hydraulic systems 320 may include first hydraulic system 330, second hydraulic system 332, and third hydraulic system 334.

Wing 302 has area 336. Area 336 may be outboard of a most outboard spoiler of wing 302. Hydraulic control module 326, remote electronics unit 322, lock system 338, latch system 340, and movement system 342 are within area 336.

Hydraulic control module 326 may selectively route hydraulic power from number of hydraulic systems 320 to systems associated with wing 302. For example, hydraulic control module 326 may selectively route hydraulic power to at least one of movement system 342 or latch system 340. Hydraulic control module 326 includes number of valves 344. Number of valves 344 may take the form of at least one of a motorized valve, a solenoid valve, a directional control valve, an electrohydraulic servo valve, or other desirable type of valve. As depicted, hydraulic control module 326 may include electrohydraulic servo valve 346, fold lock valve 348, and latch pin valve 350. In other illustrative examples hydraulic control module 326 may include other combinations of valves.

Remote electronics unit 322 may distribute electricity to components within area 336. For example, remote electronics unit 322 may distribute electricity to at least one of number of valves 344, lock actuator 328, number of latch pin actuators 362, or movement system 342. Remote electronics unit 322 may distribute electricity based on commands from computer 316. Remote electronics unit 322 may distribute commands from computer 316 to at least one of hydraulic control module 326, lock system 338, latch system 340, or movement system 342.

Lock system 338 has a number of actuators. Lock system 338 may be connected to a hydraulic power source, such as number of hydraulic systems 320. Lock system 338 includes lock valve 352, lock actuator 328, and number of locks 354. Lock valve 352 may distribute power to lock actuator 328 to move number of locks 354 between engaged position 356 and disengaged position 358. The power may be supplied by number of hydraulic systems 320. More specifically, in some illustrative examples, the power may be supplied by first hydraulic system 330 of number of hydraulic systems 320.

Latch system 340 has a number of actuators. Latch system 340 may be connected to a hydraulic power source, such as number of hydraulic systems 320. Latch system 340 includes number of latch pins 360 and number of latch pin actuators 362. Latch pin valve 350 of number of valves 344 may distribute power to number of latch pin actuators 362 to move number of latch pins 360 between disengaged position 364 and engaged position 366. The power may be supplied by number of hydraulic systems 320. More specifically, in some illustrative examples, the power may be supplied by first hydraulic system 330 of number of hydraulic systems 320.

Movement system 342 has a first number of actuators. Movement system 342 may be connected to a hydraulic power source, such as number of hydraulic systems 320. Movement system 342 includes actuator 368 and hydraulic motor 370. Actuator 368 and hydraulic motor 370 may be operated to move folding wing tip 306 between first position 310 and second position 312.

Under normal operating conditions, operation of folding wing tip 306 may be performed without using number of backup systems 372. Under normal operating conditions, operation of folding wing tip 306 may be performed using only primary power sources, primary valves, and primary actuators. For example, under normal operating conditions, operation of folding wing tip 306 may be performed using primary power sources and components within area 336.

Sensor system 324 may sense positions and/or loads of components associated with folding wing tip 306. Sensor system 324 may include: latch sensors that may sense one or more of status and position of a latch pin of number of latch pins 360; joint sensors that may sense one or more of status, position, and load of a joint; valve sensors that may sense at least one of the status or position of a valve; actuator sensors that may sense at least one of status, position, or load of an actuator; or lock sensors that may sense at least one of status or position of a lock of number of locks 354.

Sensor system 324 may also include aircraft system sensors and environment sensors. Aircraft system sensors may sense one or more of a status or functionality of various aircraft systems that may include at least one of a hydraulic system of number of hydraulic systems 320, an electrical system such as airplane electric bus 318, wiring, a flight control system such as flight deck folding wing tip control panel 314, a wing fold controller, or computer 316. Environment sensors may include sensors that detect conditions present around and/or approaching aircraft 300.

However, if one of the components in area 336 is unresponsive, number of backup systems 372 may be activated. Once activated, number of backup systems 372 may be used to perform an operation of folding wing tip 306 such as moving or securing folding wing tip 306.

Number of backup systems 372 includes number of backup actuators 374, number of backup power sources 376, and number of valves 378. Number of backup actuators 374 may replace the functionality of an actuator or a motor within area 336 which is nonresponsive. For example, number of backup actuators 374 may replace the functionality of hydraulic motor 370 if hydraulic motor 370 is nonresponsive. In other illustrative examples, number of backup actuators 374 may work in conjunction with other components in number of backup systems 372 to supply power to area 336. For example, number of backup actuators 374 may work in conjunction with other components in number of backup systems 372 to provide hydraulic power to hydraulic control module 326. Number of backup actuators 374 includes electric motor 380 and hydraulic motor 382. In some illustrative examples, electric motor 380 is connected to movement system 342. In some illustrative examples, hydraulic motor 382 is connected to movement system 342. In some illustrative examples, electric motor 380 is connected to latch system 340 and lock system 338. In some illustrative examples, hydraulic motor 382 is connected to latch system 340 and lock system 338.

Number of backup power sources 376 may provide power to area 336 if a primary power source is non-responsive. Further, number of backup power sources 376 may provide power to area 336 if components connecting a primary power source to area 336 are nonresponsive. Number of backup power sources 376 may be primary power sources for other portions of aircraft 300. For example, number of backup power sources 376 may include at least one of airplane electric bus 318, second hydraulic system 332, or third hydraulic system 334.

Number of backup power sources 376 may be connected to at least one of lock system 338, latch system 340, or movement system 342. Further, at least one of lock system 338, latch system 340, or movement system 342 may be connected to number of manual inputs 384. In some illustrative examples, a system, such as lock system 338, latch system 340, or movement system 342 may be connected to number of manual inputs 384 rather than number of backup power sources 376. In these illustrative examples, if the system becomes unresponsive while using a primary power source, the system may be manually powered using number of manual inputs 384.

In some illustrative examples, a system, such as lock system 338, latch system 340, or movement system 342 may be connected to both number of manual inputs 384 and number of backup power sources 376. In these illustrative examples, if the system becomes nonresponsive while using a primary power source, number of backup power sources 376 may be activated. In these illustrative examples, if the system becomes nonresponsive while using number of backup power sources 376, the system may be manually powered using number of manual inputs 384.

Number of valves 378 includes electrohydraulic servo valve 385, select valve 386, and number of isolation valves 388. Number of valves 378 may be used to replace the functionality of primary valves in area 336 if the primary valves become nonresponsive. For example, number of valves 378 may replace the functionality of electrohydraulic servo valve 346 of number of valves 344. In this illustrative example, electrohydraulic servo valve 385 may be used to replace the functionality of electrohydraulic servo valve 346. In this illustrative example, select valve 386 may be connected to both electrohydraulic servo valve 346 and electrohydraulic servo valve 385, and select between the two valves.

In some illustrative examples, electrohydraulic servo valve 346 may be referred to as a primary electrohydraulic servo valve. Electrohydraulic servo valve 385 may be referred to as a backup electrohydraulic servo valve. In some illustrative examples, movement system 342 is connected to a primary electrohydraulic servo valve and wherein the backup valve is a backup electrohydraulic servo valve connected to movement system 342 and connected to the primary electrohydraulic servo valve through a valve.

Number of valves 378 may be used to direct power to area 336 from number of backup power sources 376. In these illustrative examples at least one of select valve 386 or number of isolation valves 388 may be used to direct power from number of backup power sources 376. Further, in these illustrative examples at least one of select valve 386 or number of isolation valves 388 may be used to select from at least one of primary power sources or number of backup power sources 376.

Number of backup systems 372 may also include components to connect or facilitate use of number of backup actuators 374, number of backup power sources 376, or number of valves 378 by at least one of hydraulic control module 326, lock system 338, latch system 340, or movement system 342. Number of backup systems 372 may include no back 390, torque limiter 392, relay 394, reservoir 396, pump 398, or circuit breaker 399.

Although systems associated with folding wing tip 306 are depicted and discussed, similar systems may be associated with folding wing tip 308. For example, wing 304 may also have a respective lock system, latch system, and movement system associated with folding wing tip 308. Further, wing 304 may also be associated with number of backup systems 372.

During operation of aircraft 300, both folding wing tip 306 and folding wing tip 308 may initially be operated using only primary power sources, primary valves, and primary actuators. Should a system associated with one of folding wing tip 306 and folding wing tip 308 become nonresponsive, number of backup systems 372 may be activated. For example, number of backup systems 372 may be activated and used to perform operations of folding wing tip 306. In these illustrative examples, if the systems associated with folding wing tip 308 are still responsive, number of backup systems 372 may be used to perform operations of folding wing tip 306 while operations of folding wing tip 308 are performed using only primary power sources, primary valves, and primary actuators. In other illustrative examples, the systems associated with folding wing tip 306 may still be responsive and number of backup systems 372 may be used to perform operations of folding wing tip 308 while operations of folding wing tip 306 are performed using only primary power sources, primary valves, and primary actuators. In other illustrative examples, number of backup systems 372 may be used to perform operations of both folding wing tip 306 and folding wing tip 308.

Figure 4:
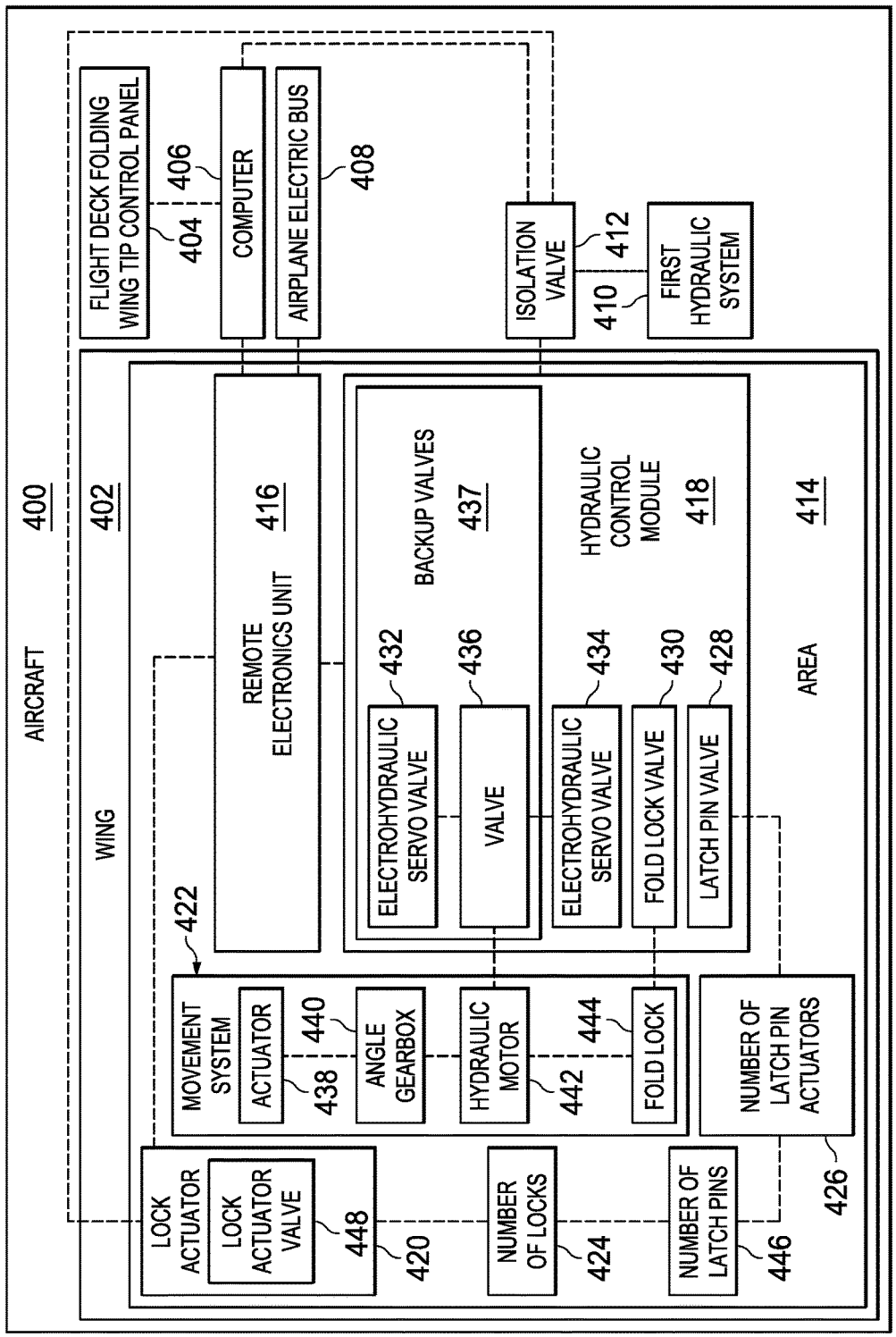
FIG. 4 is an illustration of a block diagram of an aircraft having a number of backup systems in accordance with an illustrative embodiment.

Turning now to FIG. 4, an illustration of a block diagram of an aircraft having a number of backup systems is depicted in accordance with an illustrative embodiment. Aircraft 400 is an example of aircraft 300 having number of backup systems 372 in FIG. 3. Aircraft 400 has wing 402, flight deck folding wing tip control panel 404, computer 406, airplane electric bus 408, central hydraulic system 410, and isolation valve 412. Flight deck folding wing tip control panel 404 may send signals to computer 406. Computer 406 is operably connected to isolation valve 412 and remote electronics unit 416. Computer 406 may direct isolation valve 412 to distribute hydraulic power from first hydraulic system 410. Computer 406 may send commands to remote electronics unit 416 to direct electricity to hydraulic control module 418 and lock actuator 420. Isolation valve 412 may distribute hydraulic power to hydraulic control module 418 and lock actuator 420.

Wing 402 has area 414. As depicted, remote electronics unit 416, hydraulic control module 418, lock actuator 420, movement system 422, number of locks 424, and number of latch pin actuators 426 are within area 414. Remote electronics unit 416 is operably connected to hydraulic control module 418 and lock actuator 420. Remote electronics unit 416 may receive commands from computer 406. Remote electronics unit 416 may direct electricity from airplane electric bus 408 to lock actuator 420 and hydraulic control module 418.

Hydraulic control module 418 may control hydraulic power supplied to movement system 422 and number of latch pin actuators 426. Hydraulic control module 418 includes latch pin valve 428, fold lock valve 430, electrohydraulic servo valve 432, electrohydraulic servo valve 434, and valve 436. Electrohydraulic servo valve 434, fold lock valve 430, and latch pin valve 428 are primary valves. In this illustrative example, electrohydraulic servo valve 432 and valve 436 are backup valves 437.

In this illustrative example, electrohydraulic servo valve 432 and valve 436 are only used if electrohydraulic servo valve 434 is unresponsive. Electrohydraulic servo valve 434 may be determined to be unresponsive by detecting the status of electrohydraulic servo valve 434 using a number of sensors. Electrohydraulic servo valve 434 may be determined to be unresponsive by detecting a failure of movement system 422 to respond to commands from computer 406. If electrohydraulic servo valve 434 is nonresponsive, valve 436 may be used to select electrohydraulic servo valve 432. Thus, electrohydraulic servo valve 432 may direct hydraulic power to hydraulic motor 442.

Movement system 422 includes actuator 438, angle gearbox 440, hydraulic motor 442, and fold lock 444. Actuator 438 actuates movement of the folding wing tip of wing 402. Hydraulic motor 442 translates hydraulic power into motion. Fold lock 444 may lock folding wing tip in place. In one illustrative example, fold lock 444 may be associated with hydraulic motor 442 and prevent hydraulic motor 442 from functioning when fold lock 444 is engaged. Fold lock valve 430 may control sending hydraulic power to fold lock 444.

Latch pin valve 428 may send hydraulic power to number of latch pin actuators 426. Number of latch pin actuators 426 may move number of latch pins 446 between a disengaged position and an engaged position. Number of locks 424 is associated with number of latch pins 446. Number of locks 424 may engage number of latch pins 446 to hold number of latch pins 446 in one of the disengaged position and the engaged position. Number of locks 424 is moved by lock actuator 420. Lock actuator 420 is associated with lock actuator valve 448 which is controlled by remote electronics unit 416 and receives hydraulic power from isolation valve 412.

Hydraulic control module 418 does not utilize backup valves 437 if the primary actuators, primary valves, and primary power sources are responsive. Hydraulic control module 418 does not utilize backup valves 437 if electrohydraulic servo valve 434 is functioning desirably. Backup valves 437 may only be utilized if electrohydraulic servo valve 434 is nonresponsive or functioning undesirably.

Figure 5:
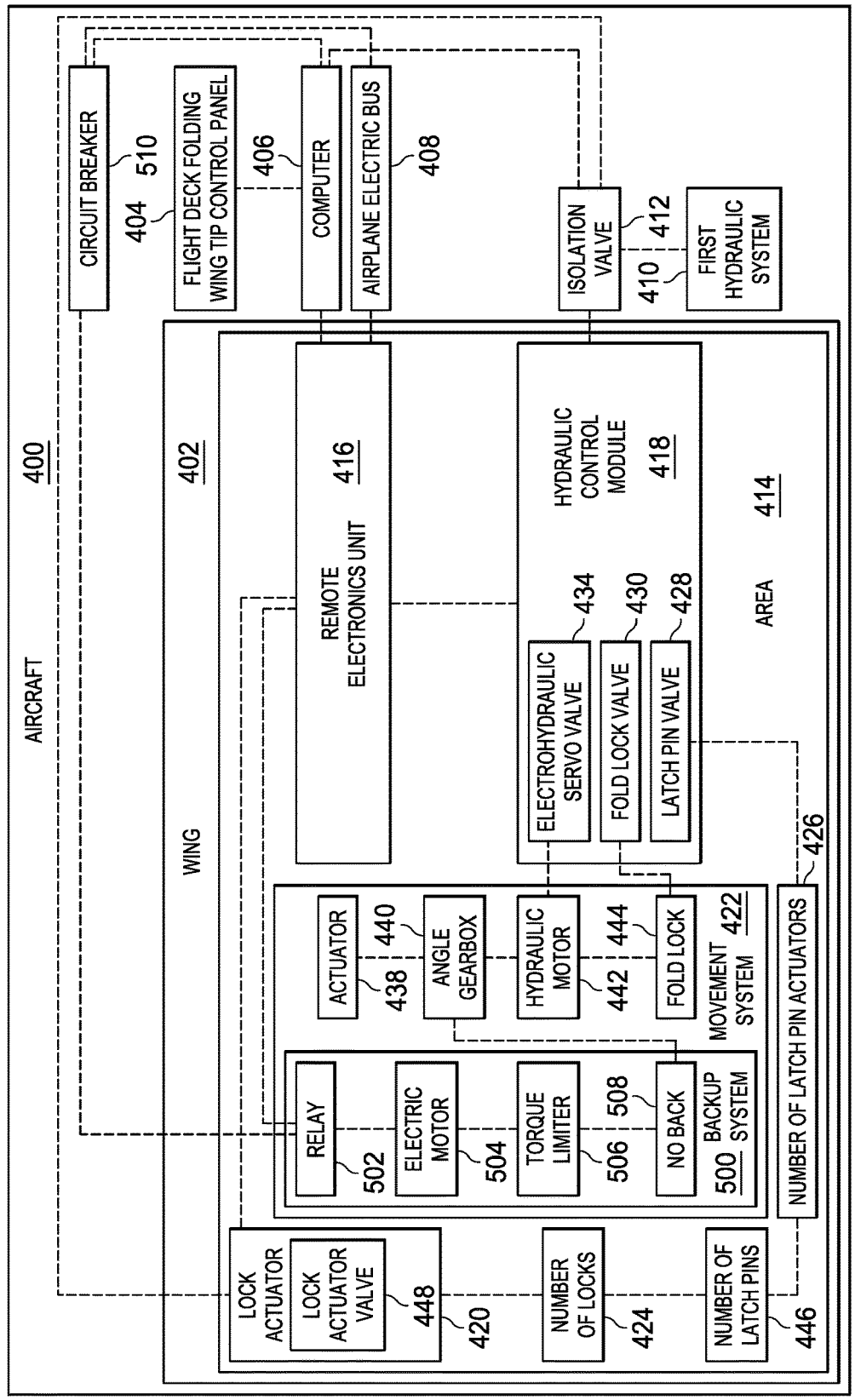
FIG. 5 is an illustration of a block diagram of an aircraft having a number of backup systems in accordance with an illustrative embodiment.

Turning now to FIG. 5, an illustration of a block diagram of an aircraft having a number of backup systems is depicted in accordance with an illustrative embodiment. FIG. 5 depicts aircraft 400 having the same primary actuators, primary valves, and primary power sources. However, in FIG. 5, the number of backup systems is different from FIG. 4. In other words, backup valves 437 are not present in FIG. 5.

In this illustrative example, movement system 422 has backup system 500. In this illustrative example, backup system 500 receives electricity from remote electronics unit 416 and provides motion to angle gearbox 440. Backup system 500 may allow movement system 422 to move a folding wing tip should electrohydraulic servo valve 434 be unresponsive. Backup system 500 may allow movement system 422 to move a folding wing tip should hydraulic motor 442 be unresponsive.

Backup system 500 includes relay 502, electric motor 504, torque limiter 506, and no back 508. Relay 502 receives electricity from remote electronics unit 416 and sends electricity to electric motor 504. Electric motor 504 translates electricity into motion. Electric motor 504 may also be referred to as a backup motor or a backup actuator. Torque limiter 506 may protect at least one of electric motor 504 and angle gearbox 440 from damage from mechanical overload. No-back 508 prevents undesirable results if there is a disconnect of the drive shaft connecting angle gearbox 440 to electric motor 504.

No-back 508 may also provide for only a resisting load be provided to electric motor 504. During movement of the wingtip downward into a flight position, no-back 508 may carry the weight of the wingtip. As a result, no-back 508 may allow for controlled motion of the wingtip using electric motor 504. No-back 508 may also protect operators during manual operation. No-back 508 may block the weight of a wingtip from reaching an operator's tool. For example, without a no-back 508, the weight of a wingtip may cause backdrive on a mechanic's wrench.

Circuit breaker 510 may protect each component downstream of circuit breaker 510 from damage by an overload or short circuit. Circuit breaker 510 may be connected to relay 502 to protect relay 502 from damage by an overload or short circuit. Circuit breaker 510 may detect a fault condition and interrupt current flow from airplane electric bus 408 to relay 502.

Movement system 422 does not utilize backup system 500 if the primary actuators, primary valves, and primary power sources are responsive. Movement system 422 does not utilize backup system 500 if movement system 422 is functioning desirably. Backup system 500 may only be utilized if at least one of movement system 422, hydraulic motor 442, electrohydraulic servo valve 434, hydraulic control module 418, isolation valve 412, or first hydraulic system 410 is non-responsive or operating undesirably.

Figure 6:
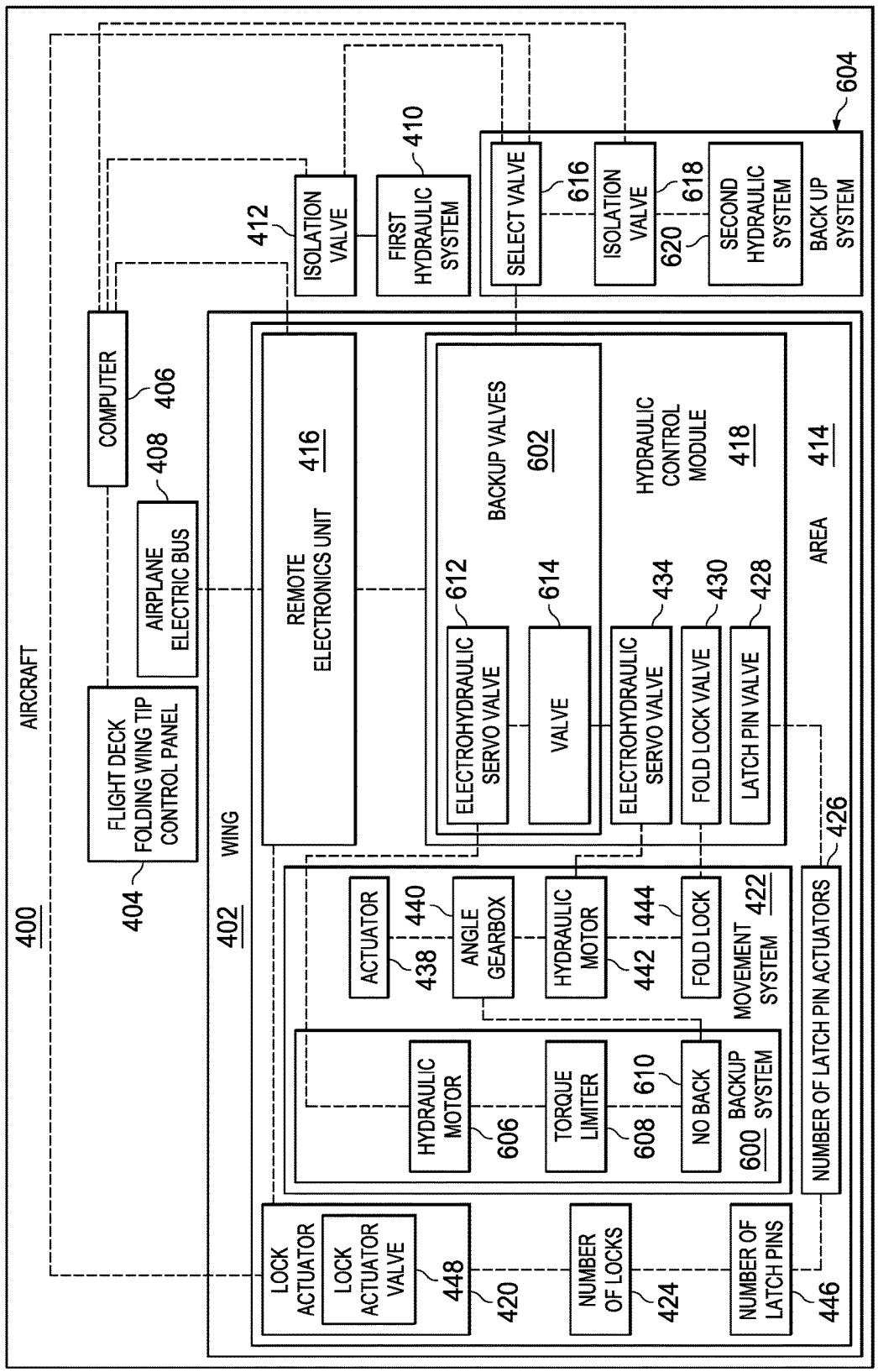
FIG. 6 is an illustration of a block diagram of an aircraft having a number of backup systems in accordance with an illustrative embodiment.

Turning now to FIG. 6, an illustration of a block diagram of an aircraft having a number of backup systems is depicted in accordance with an illustrative embodiment. FIG. 6 depicts aircraft 400 having the same primary actuators, primary valves, and primary power sources. However, in FIG. 6, the number of backup systems is different from FIG. 4. In other words, backup valves 437 are not present in FIG. 6.

In this illustrative example, aircraft 400 has backup system 600, backup valves 602, and backup system 604. In this illustrative example, backup system 600 receives hydraulic power from hydraulic control module 418 and provides motion to angle gearbox 440. Backup system 600 may allow movement system 422 to move a folding wing tip should hydraulic motor 442 be unresponsive. Backup system 600 may allow movement system 422 to move a folding wing tip should electrohydraulic servo valve 434 be unresponsive or operating undesirably.

Backup system 600 includes hydraulic motor 606, torque limiter 608, and no back 610. Hydraulic motor 606 translates hydraulic power into motion. Hydraulic motor 606 may be referred to as a backup motor or a backup actuator. Torque limiter 608 may protect structures downstream from torque limiter 608 from damage from mechanical overload. Torque limiter 608 may protect at least one of hydraulic motor 606 and angle gearbox 440 from damage from mechanical overload. No-back 610 prevents undesirable results if there is a disconnect of the drive shaft connecting angle gearbox 440 to hydraulic motor 606.

Backup system 600 receives hydraulic power through backup valves 602. Backup valves 602 include electrohydraulic servo valve 612 and valve 614. Valve 614 may select between electrohydraulic servo valve 434 and electrohydraulic servo valve 612.

Backup valves 602 may be utilized if at least one of hydraulic motor 442 or electrohydraulic servo valve 434 is not responsive or functioning undesirably. Backup valves 602 may be utilized if movement system 422 does not respond to a command.

Backup system 604 provides a backup power source for hydraulic control module 418. Backup system 604 includes select valve 616, isolation valve 618, and second hydraulic system 620. Second hydraulic system 620 may be a pre-existing power source. Second hydraulic system 620 may be a primary power source for other systems on aircraft 400. However, in this illustrative example, second hydraulic system 620 is a backup power source for hydraulic control module 418. As a result, second hydraulic system 620 is only used by hydraulic control module 418 if at least one of first hydraulic system 410, isolation valve 412, or functional components within area 414 are non-responsive or operating undesirably. For example, select valve 616 may select second hydraulic system 620 to provide hydraulic power to hydraulic control module 418 if at least one of number of latch pins 446, number of locks 424, number of latch pin actuators 426, or movement system 422 is non-responsive or operating undesirably.

During operation of aircraft 400 one or more of backup system 600, backup valves 602, and backup system 604 may be used. Although backup system 600 and backup valves 602 may be used in conjunction, backup system 604 may be used independently of backup system 600 or backup valves 602.

To select which of backup system 600, backup valves 602, and backup system 604 to operate, responsiveness of several of the functional components within area 414 may be determined. For example, it may be determined if number of locks 424, number of latch pins 446, fold lock 444, and hydraulic motor 442 are responsive. If hydraulic motor 442 is unresponsive but each of number of locks 424, number of latch pins 446, and fold lock 444 are responsive, first hydraulic system 410 is functioning desirably. In this example, one of hydraulic motor 442 and electrohydraulic servo valve 434 is not functioning desirably. Accordingly, backup valves 602 and backup system 600 may be operated. However, in this example, backup system 604 may not be operated.

If each of number of locks 424, number of latch pins 446, and fold lock 444 are non-responsive, first hydraulic system 410 may not be functioning desirably. Accordingly, backup system 604 may be operated.

Aircraft 400 does not utilize backup system 600, backup valves 602, or backup system 604 if the primary actuators, primary valves, and primary power sources are responsive. Aircraft 400 does not utilize backup system 600 or backup valves 602 if movement system 422 is functioning desirably. Aircraft 400 may not utilize backup system 604 if the components in area 414 are responsive. Backup system 604 may only be utilized if at least one of movement system 422, number of latch pins 446, number of locks 424, or fold lock 444 is non-responsive or operating undesirably.

Figure 7:
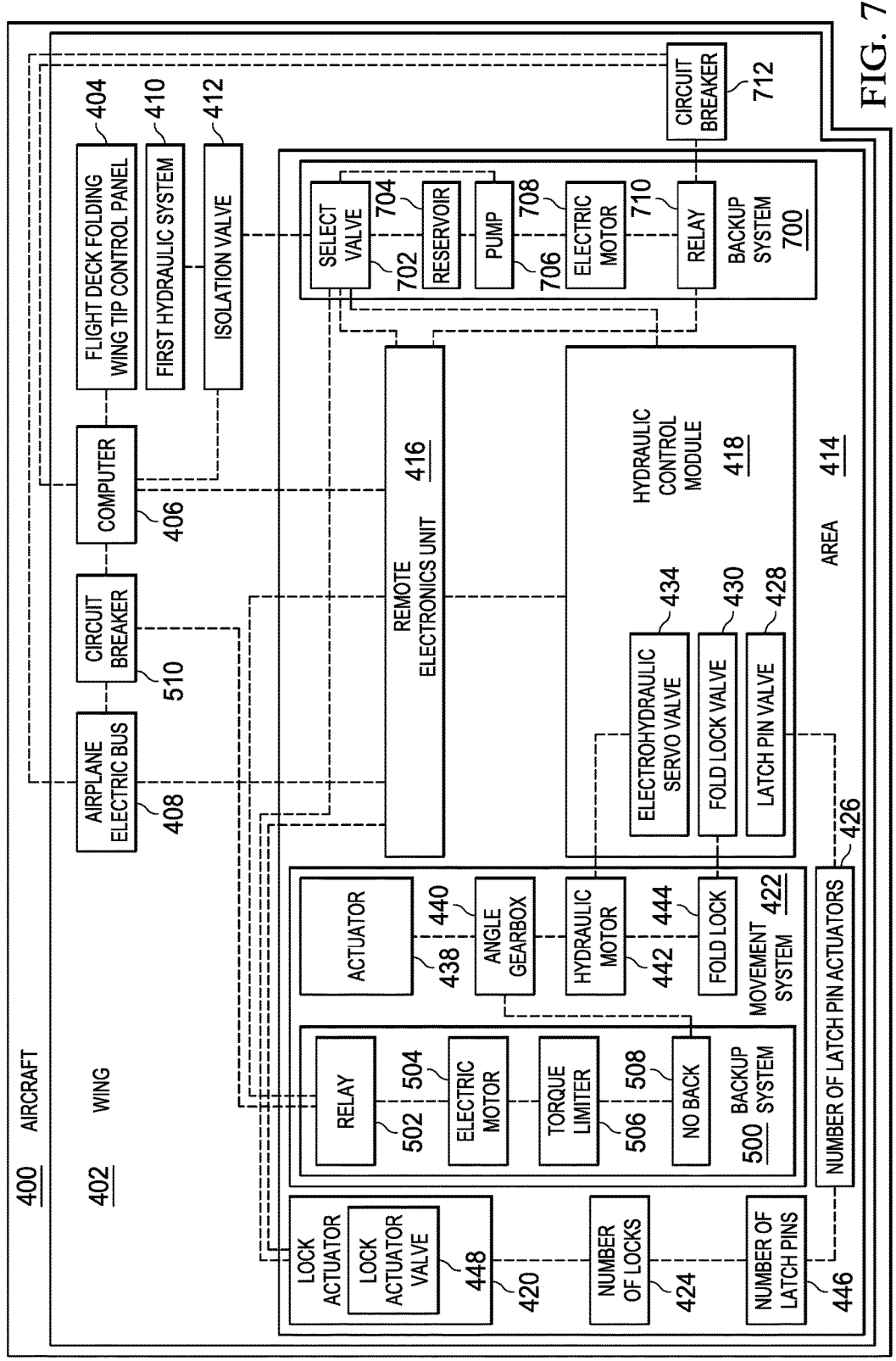
FIG. 7 is an illustration of a block diagram of an aircraft having a number of backup systems in accordance with an illustrative embodiment.

Turning now to FIG. 7, an illustration of a block diagram of an aircraft having a number of backup systems is depicted in accordance with an illustrative embodiment. FIG. 7 depicts aircraft 400 having the same primary actuators, primary valves, and primary power sources. However, in FIG. 7, the number of backup systems is different from FIG. 4. In other words, backup valves 437 are not present in FIG. 7.

In this illustrative example, movement system 422 includes backup system 500 as shown in FIG. 5. The components of backup system 500 are described above in detail with reference to FIG. 5.

In this illustrative example, aircraft 400 also includes backup system 700. Backup system 700 provides a backup power source for hydraulic control module 418 and lock actuator 420. Backup system 700 may provide power if at least one of isolation valve 412 or first hydraulic system 410 is nonresponsive or operating undesirably.

Backup system 700 includes select valve 702, reservoir 704, pump 706, electric motor 708, and relay 710. Select valve 702 may select one of hydraulic power provided by first hydraulic system 410 or hydraulic power provided by pump 706.

Pump 706 may be operated by mechanical energy generated by electric motor 708. Electricity is provided by airplane electric bus 408 to electric motor 708 through relay 710. Electric motor 708 translates electricity into mechanical energy which may power pump 706. Reservoir 704 may store hydraulic fluid to support pump 706. In some illustrative examples, reservoir 704 may store hydraulic fluid to protect pump 706 from undesirable conditions. Hydraulic fluid from reservoir 704 may be used to protect against cavitation in pump 706 during operation of a folding wing tip.

Circuit breaker 712 may protect each component downstream of circuit breaker 712 from damage by an overload or short circuit. Circuit breaker 712 may be connected to relay 710 to protect relay 710 from damage by an overload or short circuit. Circuit breaker 712 may detect a fault condition and interrupt current flow from airplane electric bus 408 to relay 710.

During operation of aircraft 400 one or more of backup system 500 and backup system 700 may be used. Although backup system 500 and backup system 700 may both be used, backup system 500 may be used independently of backup system 700.

To select which of backup system 500 and backup system 700 to operate, responsiveness of several of the functional components within area 414 may be determined. For example, it may be determined if number of locks 424, number of latch pins 446, fold lock 444, and hydraulic motor 442 are responsive. If hydraulic motor 442 is unresponsive but each of number of locks 424, number of latch pins 446, and fold lock 444 are responsive, first hydraulic system 410 is functioning desirably. In this example, one of hydraulic motor 442 and electrohydraulic servo valve 434 is not functioning desirably. Accordingly, backup system 500 may be operated. However, in this example, backup system 700 may not be operated.

If each of number of locks 424, number of latch pins 446, and fold lock 444 are non-responsive, first hydraulic system 410 may not be functioning desirably. Accordingly, backup system 700 may be operated.

Aircraft 400 does not utilize backup system 500 and backup system 700 if the primary actuators, primary valves, and primary power sources are responsive. Aircraft 400 may not utilize backup system 500 or backup system 700 if movement system 422 is functioning desirably. Aircraft 400 may not utilize backup system 700 if the components in area 414 are responsive. Backup system 700 may only be utilized if at least one of movement system 422, number of latch pins 446, number of locks 424, or fold lock 444 is not responsive or operating undesirably.

Figure 8:
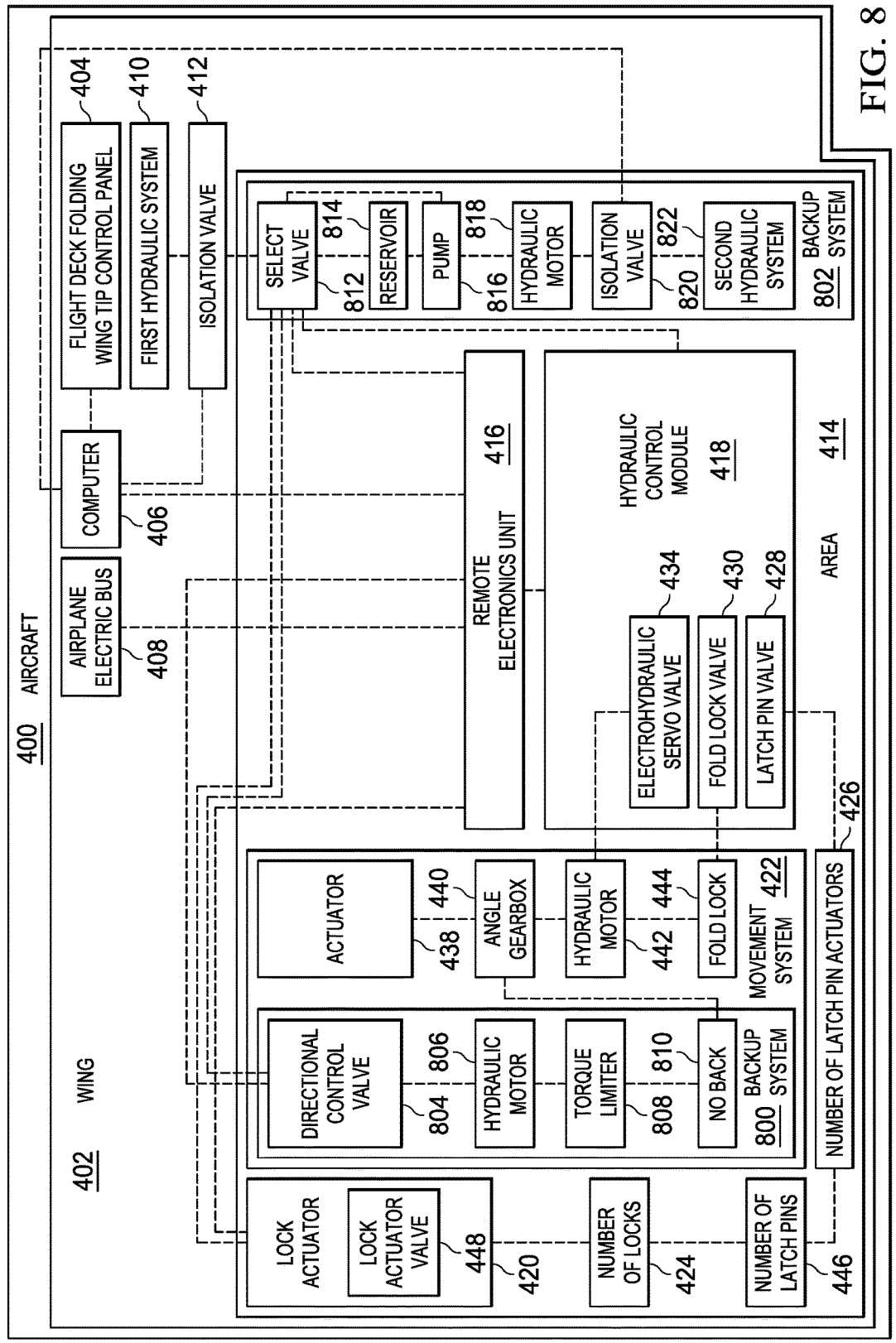
FIG. 8 is an illustration of a block diagram of an aircraft having a number of backup systems in accordance with an illustrative embodiment.

Turning now to FIG. 8, an illustration of a block diagram of an aircraft having a number of backup systems is depicted in accordance with an illustrative embodiment. FIG. 8 depicts aircraft 400 having the same primary actuators, primary valves, and primary power sources. However, in FIG. 8, the number of backup systems is different from FIG. 4. In other words, backup valves 437 are not present in FIG. 8.

In this illustrative example, aircraft 400 includes backup system 800 and backup system 802. Backup system 800 may provide a backup actuator for moving a folding wing tip. Backup system 800 may be present in movement system 422.

Backup system 800 includes directional control valve 804, hydraulic motor 806, torque limiter 808, and no back 810. Directional control valve 804 may direct fluid to hydraulic motor 806. Directional control valve 804 may control the "direction" hydraulic motor 806 moves.

Backup system 802 includes select valve 812, reservoir 814, pump 816, hydraulic motor 818, isolation vale 820, and second hydraulic system 822. Backup system 802 may function as a power transfer unit. A power transfer unit may transfer hydraulic power from one hydraulic system to another hydraulic system without any intermixing of hydraulic fluid between the two hydraulic systems. In this illustrative example, backup system 802 may provide hydraulic power from second hydraulic system 822 to first hydraulic system 410. Backup system 802 may provide hydraulic power to hydraulic control module 418. Further, pump 816 may pressurize fluid from reservoir 814 to power operations of the folding wing tip.

Second hydraulic system 822 may be a pre-existing power source. Second hydraulic system 822 may be a primary power source for other systems on aircraft 400. However, in this illustrative example, second hydraulic system 822 is a backup power source for hydraulic control module 418. As a result, second hydraulic system 822 is only used by hydraulic control module 418 if at least one of first hydraulic system 410, isolation valve 412, or functional components within area 414 are non-responsive or operating undesirably.

Aircraft 400 does not utilize backup system 800 and backup system 802 if the primary actuators, primary valves, and primary power sources are responsive. Aircraft 400 may not utilize backup system 800 or backup system 802 if movement system 422 is functioning desirably. Aircraft 400 may not utilize backup system 802 if the components in area 414 are responsive. Backup system 802 may only be utilized if at least one of movement system 422, number of latch pins 446, number of locks 424, or fold lock 444 is not responsive or operating undesirably.

Figure 9:
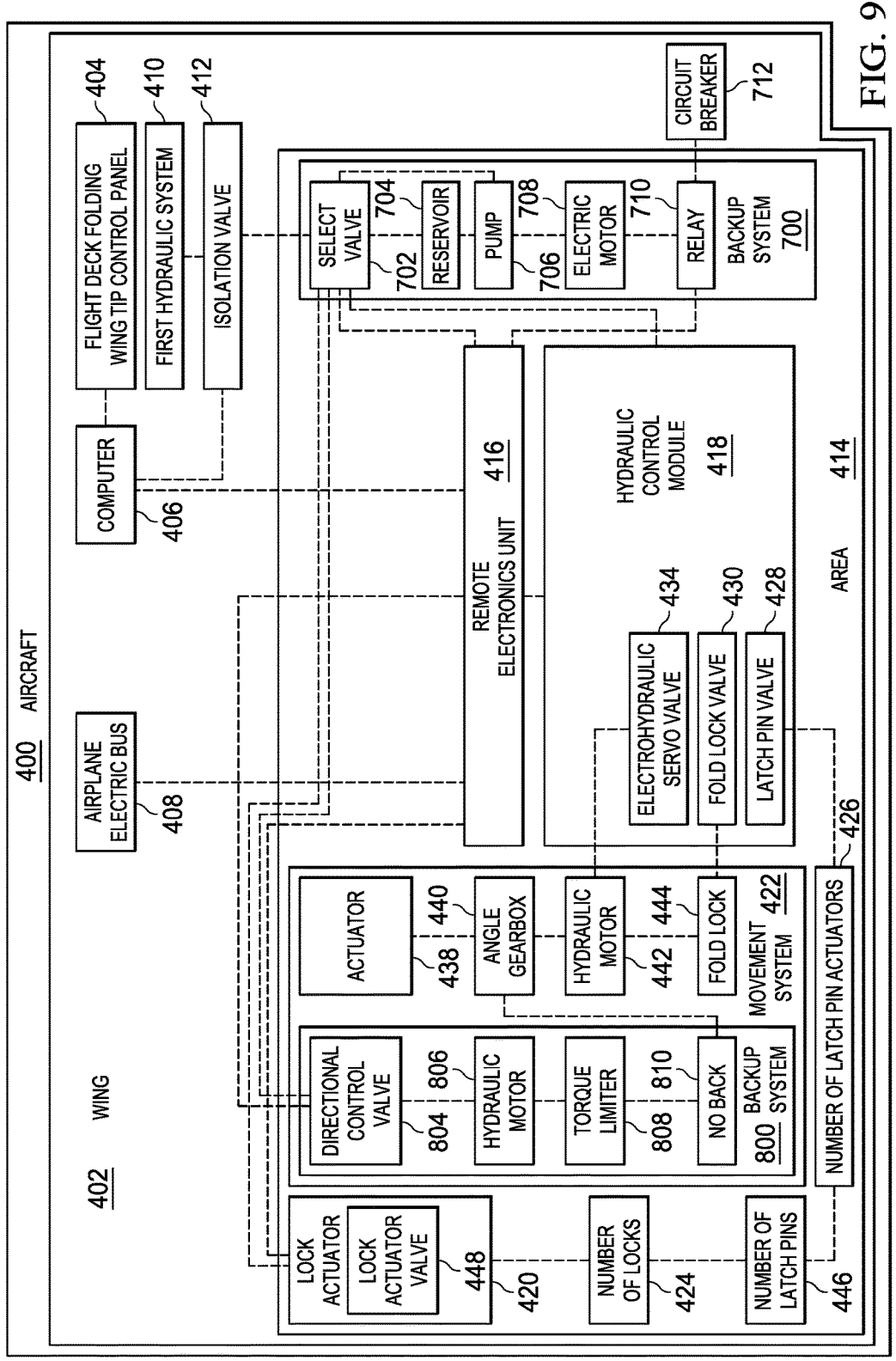
FIG. 9 is an illustration of a block diagram of an aircraft having a number of backup systems in accordance with an illustrative embodiment.

Turning now to FIG. 9, an illustration of a block diagram of an aircraft having a number of backup systems is depicted in accordance with an illustrative embodiment. FIG. 9 depicts aircraft 400 having the same primary actuators, primary valves, and primary power sources. However, in FIG. 9, the number of backup systems is different from FIG. 4. In other words, backup valves 437 are not present in FIG. 9.

In FIG. 9, aircraft 400 includes backup system 800 and backup system 700. The components of backup system 700 are described above in detail with reference to FIG. 7. The components of backup system 800 are described above in detail with reference to FIG. 8.

Aircraft 400 does not utilize backup system 800 and backup system 700 if the primary actuators, primary valves, and primary power sources are responsive. Aircraft 400 may not utilize backup system 800 or backup system 700 if movement system 422 is functioning desirably. Aircraft 400 may not utilize backup system 700 if the components in area 414 are responsive. Backup system 700 may only be utilized if at least one of movement system 422, number of latch pins 446, number of locks 424, or fold lock 444 is not responsive or operating undesirably.

The illustrations of aircraft 300 in FIG. 3, aircraft 400 in FIGS. 4-9, and aircraft depictions in FIGS. 1 and 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, other components such as wiring, circuit breakers, a brake, or other desirable components may be present in area 336 of aircraft 300. Further, as each component moves between two different positions, there may be a range of intermediate positions that the component may move through. For example, as folding wing tip 306 moves from first position 310 to second position 312, folding wing tip 306 moves through a range of intermediate positions.

As another example, although hydraulic control module 326 and hydraulic control module 418 are depicted as a single functional component, hydraulic control module 326 or hydraulic control module 418 may be broken into two or more physical components for at least one of spatial integration reasons, to limit effects on multiple valves, or for other desirable reasons. For example, fold lock valve 348 and latch pin valve 350 may be in separate housings. In some illustrative examples, fold lock valve 348 and latch pin valve 350 may be in a housing separate from electrohydraulic servo valve 346. Fold lock valve 348 and Latch pin valve 350 may be physically separated from at least electrohydraulic servo valve so that an undesirable condition, such as a crack, may not affect responsiveness of number of latch pins 360 and number of locks 354.

The different components shown in FIGS. 1-2 and 4-9 may be combined with components in FIG. 3, used with components in FIG. 3, or a combination of the two. Additionally, some of the components in FIGS. 1-2 and 4-9 may be illustrative examples of how components shown in block form in FIG. 3 may be implemented as phys cal structures.

Figure 10:
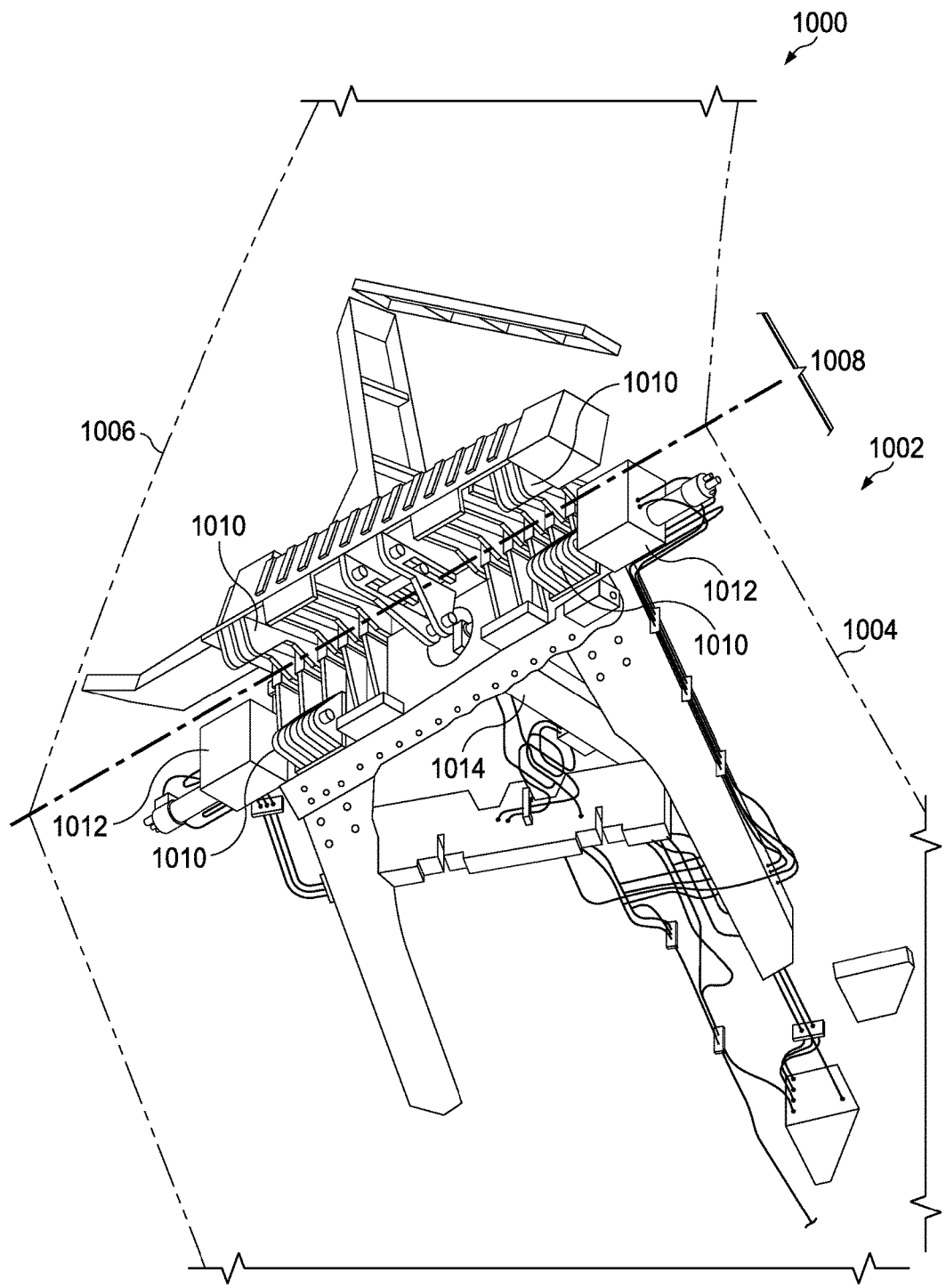
FIG. 10 is an illustration of a wing having a wing fold system in which a backup system may be implemented in accordance with an illustrative embodiment.

Turning now to FIG. 10, an illustration of a wing having a wing fold system in which a backup system may be implemented is depicted in accordance with an illustrative embodiment. FIG. 10 depicts a wing embodying a wing fold system controlled by a wing fold controller. Wing 1002 may be an illustrative embodiment of wing 302 of aircraft 300 of FIG. 3 and wing 102/104 of aircraft 100 of FIG. 1. FIG. 10 depicts an underside of wing 1002 in a folded position. Wing 1002 may include fixed portion 1004, folding wing tip 1006, and wing fold system 1008.

Fixed portion 1004 may be an implementation of fixed portion 124 of wing 102 and fixed portion 126 of wing 104 of FIG. 1 and FIG. 2. Fixed portion 1004 of wing 1002 may include a wing box and moveable control surfaces (not shown).

Folding wing tip 1006 may be an implementation of folding wing tip 120 of wing 102, folding wing tip 122 of wing 104 of FIG. 1, and folding wing tip 306 of wing 302 of FIG. 3. Folding wing tip 1006 may rotate with respect to fixed portion 1004 of wing 1002 between a flight position and a folded position. Folding wing tip 1006 of wing 1002 may not include moveable control surfaces. In alternative examples, a control surface may be included in folding wing tip 1006.

Wing fold system 1008 may be an implementation of a wing fold system of a wing of an aircraft, such as wing 102 and wing 104 of aircraft 100 of FIG. 1 and FIG. 2. Wing fold system 1008 may be an implementation of wing fold system to move folding wing tip 306 of aircraft 300 of FIG. 3. Wing fold system 1008 may move folding wing tip 1006 with respect to fixed portion 1004 in response to a wing fold controller, such as flight deck folding wing tip control panel 314 of FIG. 3. Wing fold system 1008 may include latches 1010, locks 1012, and actuator 1014.

Latches 1010 may latch and secure folding wing tip 1006 in a flight position. Locks 1012 may engage latches 1010 when latches 1010 may be in an engaged position to prevent latches 1010 from opening while folding wing tip 1006 may be in flight position. Wingtip actuator 1014 may actuate folding wing tip 1006 to transition folding wing tip 1006 between the flight position and a folded position.

Wing fold system 1000 is one illustrative example of a wing fold system for a folding wing tip, such as folding wing tip 306 of FIG. 3. Wing fold system 1000 may be an illustrative example of a wing fold system 1000 which may benefit from number of backup systems 372 of FIG. 3. Accordingly, number of backup systems 372 may be added to wing fold system 1000. Thus, wing fold system 1000 may be an example of a wing fold system in which a backup system such as number of backup systems 372 of FIG. 3 may be implemented in accordance with an illustrative embodiment.

Figure 11:
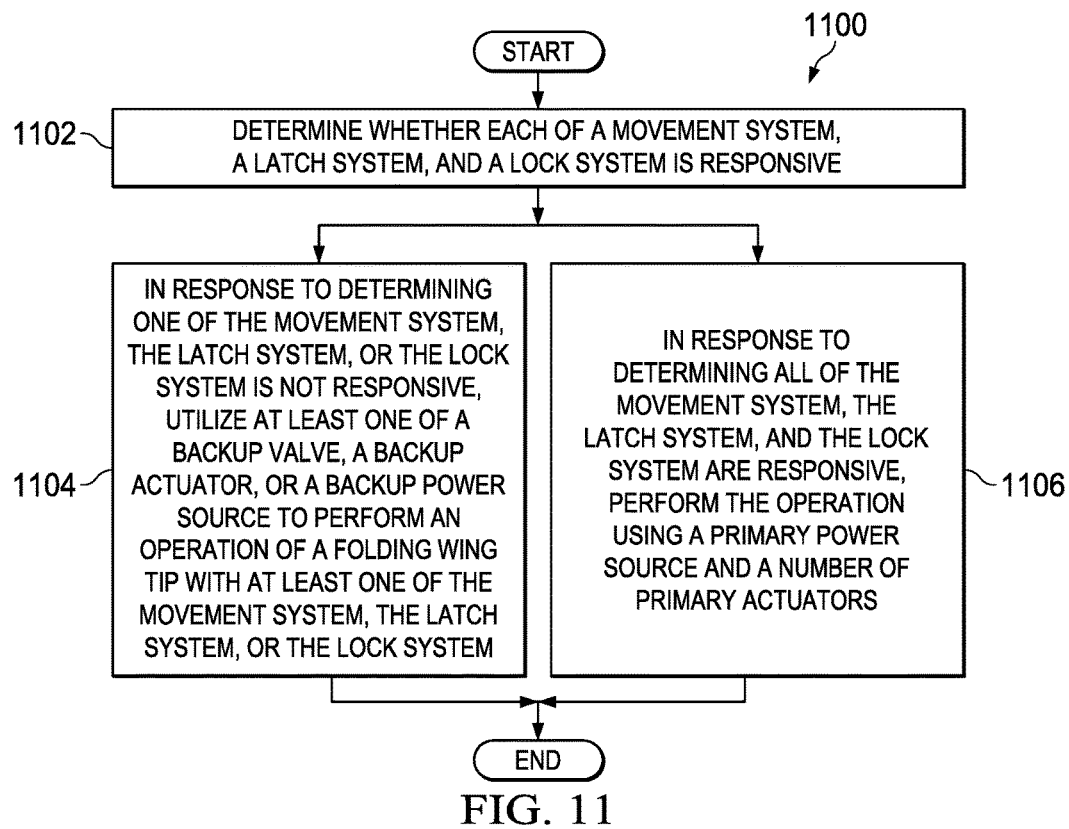
FIG. 11 is an illustration of a flowchart of a process for performing an operation of a folding wing tip in accordance with an illustrative embodiment.

Turning now to FIG. 11, an illustration of a flowchart of a process for performing an operation of a folding wing tip is depicted in accordance with an illustrative embodiment. Process 1100 may be used to perform an operation of folding wing tip 306 of FIG. 3.

Process 1100 may begin by determining whether each of a movement system, a latch system, and a lock system is responsive (1102). A sensor system such as sensor system 324 may be used to determine whether each of the movement system, the latch system, and the lock system is responsive. In some illustrative examples, a testing command may be sent to each of the systems. A system, such as one of the movement system, the latch system, and the lock system may be determined to be unresponsive if the system does not respond desirably to the testing command. A testing command may be sent only to determine if the system is responsive.

In some illustrative examples, operating commands may be sent to each of the systems. A system, such as one of the movement system, the latch system, and the lock system may be determined to be unresponsive if the system does not respond desirably to the operating commands. An operating command may be sent to perform an operation of a folding wing tip. An operating command performs an operation in addition to determining whether a system is responsive.

Process 1100 may, in response to determining one of the movement system, the latch system, or the lock system is not responsive, utilize at least one of a backup valve, a backup actuator, or a backup power source to perform an operation of a folding wing tip with at least one of the movement system, the latch system, or the lock system (1104). In some illustrative examples, utilizing at least one of the backup valve, the backup actuator, or the backup power source to perform the operation of the folding wing tip includes providing hydraulic power to at least one of the movement system, the latch system, or the lock system from the backup power source.

In some illustrative examples, the backup power source may be a pre-existing power source which may be a primary power source for other systems on the aircraft. However, in these illustrative examples, the pre-existing power source is a backup power source for at least one of the movement system, the latch system, or the lock system. As a result, the pre-existing power source is only used with at least one of the movement system, the latch system, or the lock system in response to determining one of the movement system, the latch system, or the lock system is not responsive. In some illustrative examples, the backup power source may be a second hydraulic system or a third hydraulic system of the aircraft.

In some illustrative examples, utilizing at least one of the backup valve, the backup actuator, or the backup power source to perform the operation of the folding wing tip includes providing electric power to at least one of the movement system, the latch system, or the lock system from the backup power source. In some illustrative examples, the backup power source may be a pre-existing power source which may be a primary power source for other systems on the aircraft. In some illustrative examples, the backup power source may be an airplane electric bus.

Process 1100 may, in response to determining all of the movement system, the latch system, and the lock system are responsive, perform the operation using a primary power source and a number of primary actuators (1106). Afterwards the process terminates. If all of the movement system, the latch system, and the lock system are responsive, the operation may be performed without utilizing the backup valve, the backup actuator, or the backup power source.

Figure 12:
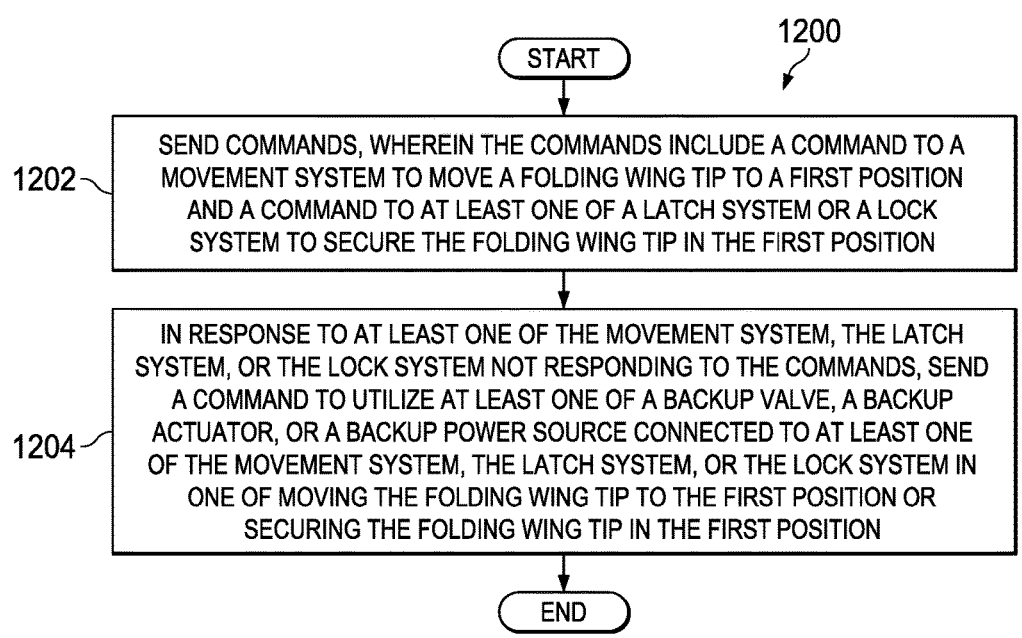
FIG. 12 is an illustration of a flowchart of a process for moving a folding wing tip and securing the folding wing tip in accordance with an illustrative embodiment.

Turning now to FIG. 12, an illustration of a flowchart of a process for moving a folding wing tip and securing the folding wing tip is depicted in accordance with an illustrative embodiment. Process 1200 may be used to perform an operation of folding wing tip 306 of FIG. 3. For example, process 1200 may be used to move folding wing tip 306 to one of first position 310 or second position 312 of FIG. 3. As another example, process 1200 may be used to secure folding wing tip 306 using at least one of lock system 338 or latch system 340 of FIG. 3.

Process 1200 may begin by sending commands, wherein the commands include a command to a movement system to move a folding wing tip to a first position and a command to at least one of a latch system or a lock system to secure the folding wing tip in the first position (1202). The latch system may place a number of latches in a disengaged position or an engaged position. The lock system may secure the latches in place by moving a number of locks to an engaged position. The number of locks may be placed into an engaged position or a disengaged position. Commands may be sent by a computer such as computer 316 of FIG. 3. Computer 316 may create commands based on inputs from a crew member or other operator.

Process 1200 may then, in response to at least one of the movement system, the latch system, or the lock system not responding to the commands, send a command to utilize at least one of a backup valve, a backup actuator, or a backup power source connected to at least one of the movement system, the latch system, or the lock system in one of moving the folding wing tip to the first position or securing the folding wing tip in the first position (1204). Afterwards the process terminates. These commands may be sent by a computer such as computer 316 of FIG. 3.

In some illustrative examples, sending the command to utilize the at least one of the backup valve, the backup actuator, or the backup power source includes sending a command to provide hydraulic power to at least one of the movement system, the latch system, or the lock system from the backup power source. In some illustrative examples, sending the command to utilize the at least one of the backup valve, the backup actuator, or the backup power source includes sending a command to provide electric power to at least one of the movement system, the latch system, or the lock system from the backup power source.

In some illustrative examples, the command to utilize at least one of a backup valve, a backup actuator, or a backup power source may be selectively sent based on which of the movement system, the latch system, or the lock system does not respond to the commands. In some illustrative examples, the command to utilize at least one of a backup valve, a backup actuator, or a backup power source may be selectively sent based on sensor data indicating an operational status of a number of components. For example, the command to utilize at least one of a backup valve, a backup actuator, or a backup power source may be selectively sent to the backup valve based on sensor data indicating a primary valve is nonresponsive. When more than one backup system is present, sensor data indicating operational status of one or more components associated with a folding wing tip may be used to select between the number of backup systems.

Figure 13:
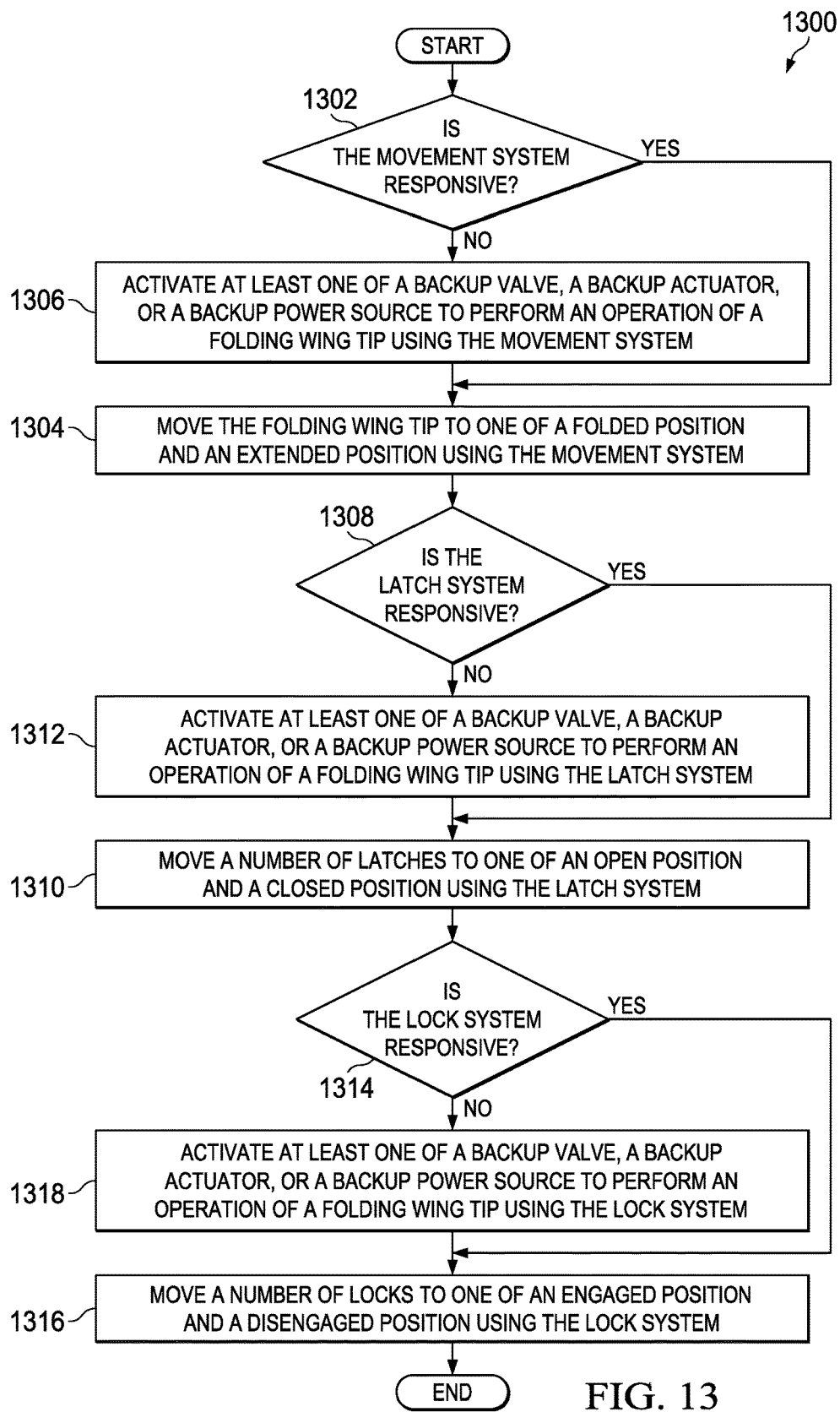
FIG. 13 is an illustration of a flowchart of a process for performing a number of operations of a folding wing tip in accordance with an illustrative embodiment.

Turning now to FIG. 13, an illustration of a flowchart of a process for performing a number of operations of a folding wing tip is depicted in accordance with an illustrative embodiment. Process 1300 may be used to perform an operation of folding wing tip 306 of FIG. 3. For example, process 1300 may be used to move folding wing tip 306 to one of first position 310 or second position 312 of FIG. 3. As another example, process 1300 may be used to secure folding wing tip 306 using at least one of lock system 338 or latch system 340 of FIG. 3.

Process 1300 may begin by determining whether the movement system is responsive (1302). If the movement system is responsive, process 1300 moves the folding wing tip to one of a folded position and an extended position using the movement system (1304). When the movement system is responsive, 1304 may be performed with only the primary systems. However, in response to determining the movement system is not responsive, process 1300 activates at least one of a backup valve, a backup actuator, or a backup power source to perform an operation of a folding wing tip using the movement system (1306). After activating at least one of the backup valve, the backup actuator, or the backup power source, process 1300 may perform 1304.

Process 1300 may determine whether the latch system is responsive (1308). If the latch system is responsive, process 1300 moves a number of latches to one of a disengaged position and an engaged position using the latch system (operation 1310). When the latch system is responsive, operation 1310 may be performed with only the primary systems. However, in response to determining the latch system is not responsive, process 1300 activates at least one of a backup valve, a backup actuator, or a backup power source to perform an operation of a folding wing tip using the latch system (1312). After activating at least one of the backup valve, the backup actuator, or the backup power source, process 1300 may perform operation 1310.

Process 1300 may determine whether the lock system is responsive (1314). When the lock system is responsive, process 1300 moves a number of locks to one of an engaged position and a disengaged position using the lock system (1316). However, in response to determining the lock system is not responsive, process 1300 activates at least one of a backup valve, a backup actuator, or a backup power source to perform an operation of a folding wing tip using the lock system (1318). After activating at least one of the backup valve, the backup actuator, or the backup power source, process 1300 may perform 1316. Afterwards the process terminates.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, 1316 may be performed prior to performing 1304 in process 1300. Further, both 1314 and 1302 may be performed prior to performing 1304. In some illustrative examples, process 1300 may further determine which of a number of backup systems to activate. For example, process 1300 may use control logic to determine a likely cause for at least one of the movement system, the latch system, or the lock system being nonresponsive. Process 1300 may compare whether each of the movement system, the latch system, and the lock system is responsive to determine which of a number of backup systems to activate. For example, if movement system is nonresponsive but the latch system and the lock system are responsive, a first backup system may be activated. However, if each of the movement system, the latch system, and the lock system are nonresponsive, a second backup system may be activated.

Figure 14:
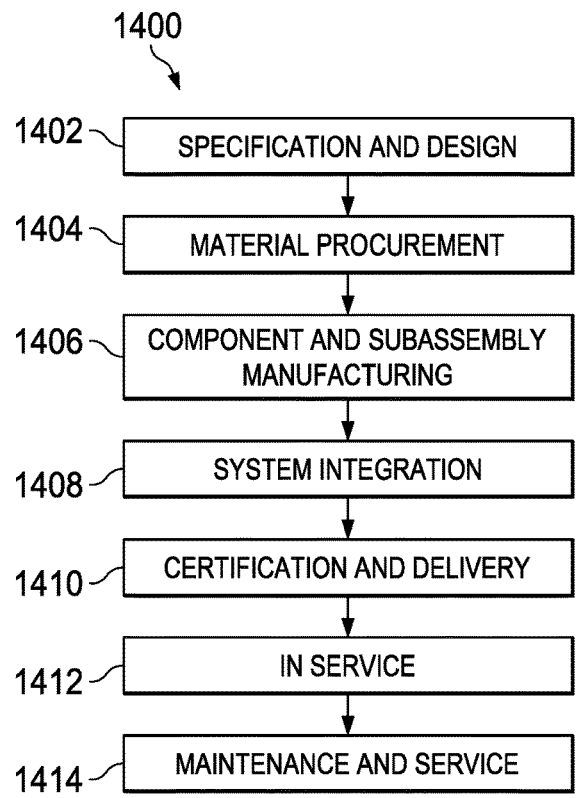
FIG. 14 is an illustration of a block diagram of an aircraft manufacturing and service method in accordance with an illustrative embodiment.
Figure 15:
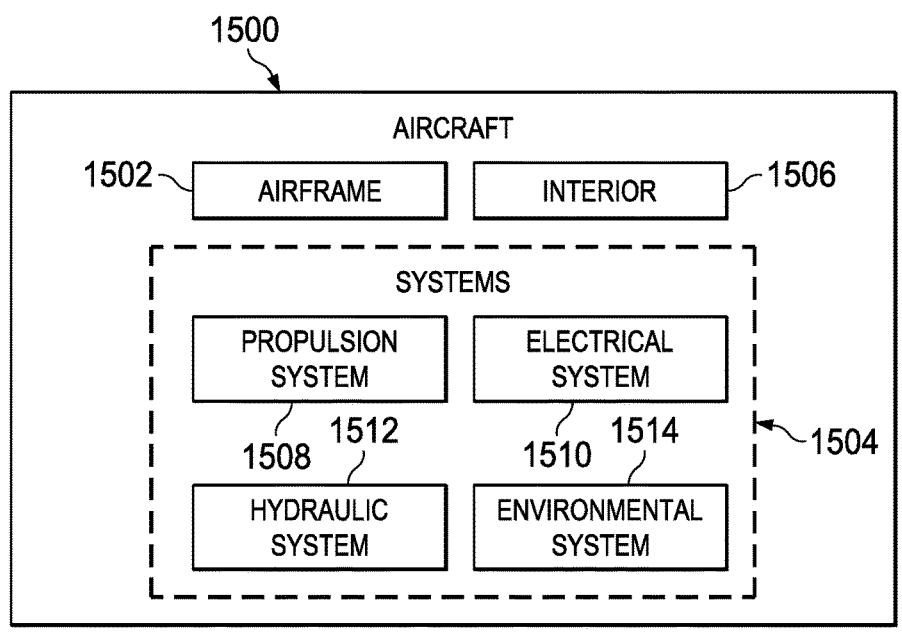
FIG. 15 is an illustration of a block diagram of an aircraft in which an illustrative embodiment may be implemented.

The illustrative embodiments of the disclosure may be described in the context of aircraft manufacturing and service method 1400 as shown in FIG. 14 and aircraft 1500 as shown in FIG. 15. Turning first to FIG. 14, an illustration of a block diagram of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of a block diagram of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry. The apparatuses and methods embodied herein may be employed during at least one of the stages of aircraft manufacturing and service method 1400 in FIG. 14.

One or more illustrative embodiments may be used during component and subassembly manufacturing 1406. For example, number of backup systems 372 may be installed in aircraft 300 during component and subassembly manufacturing 1406. Further, number of backup systems 372 may be activated to perform operations with folding wing tip 306 during in service 1412. Number of backup systems 372 may be used during maintenance and service 1414. During maintenance and service 1414, maintenance may be done on aircraft 1500 so that aircraft 1500 may operate using only primary power sources, primary valves, and primary actuators. During maintenance and service, maintenance may be done on aircraft so that aircraft 1500 may operate with number of backup systems 372 being inactive.

The illustrative embodiments provide an apparatus and method for a number of backup systems to perform operations of a folding wing tip. The number of backup systems may provide at least one of backup valves, backup power sources, or backup actuators. The number of backup systems may be utilized if a system associated with folding wing tip becomes nonresponsive. For example, the number of backup systems may be utilized if at least one of a movement system, a latch system, or a lock system becomes nonresponsive.

The illustrative embodiments may reduce maintenance time following flights. For example, a number of backup systems associated with a folding wing tip may reduce manual intervention by maintenance workers. As another example, a number of backup systems may allow an aircraft to continue to operate without maintenance if at least one of a movement system, a latch system, or a lock system becomes nonresponsive.

The illustrative embodiments may reduce cost associated with one of a movement system, a latch system, or a lock system becoming nonresponsive. For example, number of backup systems may allow for operation of folding wing tip, which may allow an aircraft to move to a gate or maintenance area. Performing maintenance at a gate or maintenance area may be less costly than performing maintenance on a runway, taxiway, or other non-maintenance areas of an airport. Operating folding wing tip using a number of backup systems may reduce an impact to other aircraft or to an airport. For example, moving a folding wing tip to a taxiing or folded position using a number of backup systems may allow the aircraft to taxi to a gate rather than blocking a taxiway, runway, or other area of an airport. As a result, a number of backup systems may reduce costs due to flight delay of other aircrafts. Thus, the additional cost of a number of backup systems due to increasing the weight of the aircraft may be less than maintenance costs, delay costs, or other costs incurred without a number of backup systems.

The description of the different illustrative embodiments has been presented for purposes of illustration and description, and may be not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
sending commands, wherein the commands include a command to a movement system to move a folding wing tip to a first position and a command to at least one of a latch system or a lock system to secure the folding wing tip in the first position; and
in response to at least one of the movement system, the latch system, or the lock system not responding to the commands, sending a command to utilize at least one of a backup valve, a backup actuator, or a backup power source connected to the at least one of the movement system, the latch system, or the lock system in one of moving the folding wing tip to the first position or securing the folding wing tip in the first position.

2. The method of claim 1, wherein sending the command to utilize the at least one of the backup valve, the backup actuator, or the backup power source connected to the at least one of the movement system, the latch system, or the lock system in one of moving the folding wing tip to the first position or securing the folding wing tip in the first position comprises:
sending a command to provide hydraulic power to the at least one of the movement system, the latch system, or the lock system from the backup power source.

3. The method of claim 1, wherein sending the command to utilize the at least one of the backup valve, the backup actuator, or the backup power source connected to the at least one of the movement system, the latch system, or the lock system in one of moving the folding wing tip to the first position or securing the folding wing tip in the first position comprises:
sending a command to provide electric power to the at least one of the movement system, the latch system, or the lock system from the backup power source.

4. An apparatus for movement of a folding wing tip, the apparatus comprising:
a movement system having a first number of actuators, the movement system connected to a hydraulic power source;
a latch system having a second number of actuators, the latch system connected to the hydraulic power source;
a lock system having a third number of actuators, the lock system connected to the hydraulic power source; and
at least one of a backup valve, a backup actuator, or a backup power source connected to at least one of the movement system, the latch system, or the lock system.

5. The apparatus of claim 4, wherein the backup actuator is an electric motor connected to the movement system.

6. The apparatus of claim 4, wherein the backup actuator is a hydraulic motor connected to the movement system.

7. The apparatus of claim 4, wherein the movement system is connected to a primary electrohydraulic servo valve, and wherein the backup valve is a backup electrohydraulic servo valve connected to the movement system and connected to the primary electrohydraulic servo valve through a valve.

8. The apparatus of claim 4, wherein the backup actuator is an electric motor connected to the latch system and the lock system.

9. The apparatus of claim 4, wherein the backup actuator is a hydraulic motor connected to the latch system and the lock system.

10. An apparatus for movement of a folding wing tip, the apparatus comprising:
a number of actuators connected to at least one of a movement system, a latch system, or a lock system;
a hydraulic power source connected to the number of actuators; and
at least one of a backup valve, a backup actuator, or a backup power source connected to at least one of the movement system, the latch system, or the lock system.

11. The apparatus of claim 10, wherein the at least one of the backup valve, the backup actuator, or the backup power source is only used if the at least one of the movement system, the latch system, or the lock system is non-responsive.

12. The apparatus of claim 10, wherein the backup actuator is an electric motor connected to the movement system.

13. The apparatus of claim 10, wherein the backup actuator is a hydraulic motor connected to the movement system.

14. The apparatus of claim 10, wherein the movement system is connected to a primary electrohydraulic servo valve, and wherein the backup valve is a backup electrohydraulic servo valve connected to the movement system and connected to the primary electrohydraulic servo valve through a valve.

15. The apparatus of claim 10, wherein the backup actuator is an electric motor connected to the latch system and the lock system.

16. The apparatus of claim 10, wherein the backup actuator is a hydraulic motor connected to the latch system and the lock system.

* * * * *